US010839819B2

(12) United States Patent
Beack et al.

(10) Patent No.: US 10,839,819 B2
(45) Date of Patent: Nov. 17, 2020

(54) BLOCK-BASED AUDIO ENCODING/DECODING DEVICE AND METHOD THEREFOR

(71) Applicant: Electronics And Telecommunications Research Institute, Daejeon (KR)

(72) Inventors: Seung Kwon Beack, Daejeon (KR); Tae Jin Lee, Daejeon (KR); Jongmo Sung, Daejeon (KR); Mi Suk Lee, Daejeon (KR); Dae Young Jang, Daejeon (KR); Jin Soo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 167 days.

(21) Appl. No.: 16/081,169

(22) PCT Filed: Mar. 21, 2017

(86) PCT No.: PCT/KR2017/002995
§ 371 (c)(1),
(2) Date: Aug. 30, 2018

(87) PCT Pub. No.: WO2017/164606
PCT Pub. Date: Sep. 28, 2017

(65) Prior Publication Data
US 2019/0035412 A1 Jan. 31, 2019

(30) Foreign Application Priority Data
Mar. 21, 2016 (KR) .................... 10-2016-0033627

(51) Int. Cl.
*G10L 19/022* (2013.01)
*H04N 19/11* (2014.01)
(Continued)

(52) U.S. Cl.
CPC .......... *G10L 19/022* (2013.01); *G10L 19/032* (2013.01); *G10L 19/04* (2013.01);
(Continued)

(58) Field of Classification Search
None
See application file for complete search history.

(56) References Cited

U.S. PATENT DOCUMENTS 7,272,556 B1 * 9/2007 Aguilar ................. G10L 19/093
704/201
7,885,819 B2 * 2/2011 Koishida ............... G10L 19/167
704/500
(Continued)

OTHER PUBLICATIONS

Johnston, Jmaes D., "Transform coding of Audio Signals Using Perceptual Noise Criteria" *Journal of Selected Areas in Communications*, vol. 6 No. 2, Feb. 1988, pp. 314-323 (10 pages in English).
(Continued)

*Primary Examiner* — Marcus T Riley
(74) *Attorney, Agent, or Firm* — NSIP Law

(57) ABSTRACT

Provided is an apparatus and method for encoding/decoding audio based on a block. A method of encoding an audio signal may include dividing each of frame of input signal that constitute an audio signal into a plurality of subframes; transforming the subframes to a frequency domain; determining a two-dimensional (2D) intra block using the subframes transformed to the frequency domain; and encoding the 2D intra block. The 2D intra block may be a block that two-dimensionally displays frequency coefficients of the subframes transformed to the frequency domain using a time and a frequency.

9 Claims, 24 Drawing Sheets

(51) Int. Cl.
*H04N 19/176* (2014.01)
*G10L 19/04* (2013.01)
*G10L 19/032* (2013.01)
*G10L 19/03* (2013.01)
*G10L 19/02* (2013.01)

(52) U.S. Cl.
CPC ........... *H04N 19/11* (2014.11); *H04N 19/176* (2014.11); *G10L 19/0204* (2013.01); *G10L 19/0212* (2013.01); *G10L 19/03* (2013.01)

(56) References Cited

U.S. PATENT DOCUMENTS

| | | | |
|---|---|---|---|
| 8,290,782 B2 | 10/2012 | Shmunk | |
| 8,380,523 B2* | 2/2013 | Kim | G10L 19/20 704/500 |
| 8,532,983 B2* | 9/2013 | Gao | G10L 21/038 704/201 |
| 8,645,146 B2* | 2/2014 | Koishida | G10L 19/008 704/500 |
| 2008/0122862 A1 | 5/2008 | Song | |
| 2009/0040997 A1* | 2/2009 | Oh | H04N 21/4347 370/345 |
| 2009/0044072 A1* | 2/2009 | Oh | H03M 13/2707 714/758 |
| 2009/0044230 A1* | 2/2009 | Oh | H04N 19/61 725/62 |
| 2009/0044231 A1* | 2/2009 | Oh | H03M 13/356 725/62 |
| 2009/0046815 A1* | 2/2009 | Oh | H04N 21/4382 375/340 |
| 2010/0070285 A1* | 3/2010 | Kim | G10L 19/20 704/500 |
| 2011/0295598 A1* | 12/2011 | Yang | G10L 21/038 704/205 |
| 2012/0209600 A1 | 8/2012 | Kim et al. | |
| 2012/0323584 A1* | 12/2012 | Koishida | G10L 19/008 704/500 |
| 2013/0094411 A1* | 4/2013 | Zhang | H04L 5/0048 370/281 |
| 2014/0366093 A1 | 12/2014 | Oh et al. | |
| 2015/0156578 A1* | 6/2015 | Alexandridis | H04R 3/005 381/92 |
| 2016/0055855 A1* | 2/2016 | Kjoerling | G10L 19/008 704/500 |
| 2019/0035412 A1* | 1/2019 | Beack | G10L 19/04 |

OTHER PUBLICATIONS

International Search Report dated Jun. 19, 2017, in corresponding International Application No. PCT/KR2017/002995 (3 pages in English, 3 pages in Korean).

* cited by examiner

BLOCK-BASED AUDIO ENCODING/DECODING DEVICE AND METHOD THEREFOR

CROSS REFERENCE TO RELATED APPLICATIONS

This application is a U.S. National Stage Application of International Application No. PCT/KR2017/002995, filed on Mar. 21, 2017, which claims the benefit under 35 USC 119(a) and 365(b) of Korean Patent Application No. 10-2016-0033627 filed on Mar. 21, 2016, in the Korean Intellectual Property Office.

TECHNICAL FIELD

At least one example embodiment relates to an apparatus and method for encoding/decoding an audio signal.

RELATED ART

Technology for encoding/decoding an audio signal refers to technology for compressing an audio signal and transmitting the compressed audio signal. The great technical developments have been achieved over the past decades.

1st generation (1G) MPEG audio encoding/decoding technology, that is, MPEG-1 layer III (MP3) technology refers to a scheme of designing a quantizer and compressing data based on a psychoacoustic model of a human being to minimize a loss of a perceptual sound quality.

2nd generation (2G) MPEG audio encoding/decoding technology, that is, MPEG-2 advanced audio coding (AAC) technology refers to a scheme of enhancing a compression performance by applying a psychoacoustic model to a full band audio frequency coefficient based on modified discrete cosine transform (MDCT).

3rd generation (3G) MPEG audio encoding/decoding technology, that is, MPEG-4 parametric coding technology refers to a scheme of enhancing a compression rate from a low bitrate of 48 kbps or less using parametric coding technology. For example, the parametric encoding/decoding technology includes parametric stereo (PS) technology for encoding/decoding a stereo channel and spectral band replication (SBR) technology for encoding/decoding a high band signal.

4th generation (4G) MPEG audio encoding/decoding technology, that is, unified speech and audio coding (USAC) technology refers to USAC audio codec technology for enhancing the sound quality of low bitrate voice, and has a compression performance similar to AAC 128 kbps to provide a CD-class high quality.

That is, the audio encoding/decoding technologies according to the related art may be understood to enhance the compression performance using the psychoacoustic model, however, to reach the limit of performance due to a quantization based on a one-dimensional (1D) psychoacoustic model.

Accordingly, there is a need for a method of enhancing an encoding rate by encoding/decoding an audio signal using another method instead of applying a 1D psychoacoustic model.

DESCRIPTION

Subject

At least one example embodiment provides an apparatus and method that may enhance an encoding rate by reconfiguring and encoding an input audio signal as a two-dimensional (2D) signal.

Also, at least one example embodiment provides an apparatus and method that may flexibly perform homogeneity and synchronization of an encoding scheme since the same framing structure as a video signal may be achieved using an encoding scheme that is interpreted based on a block unit.

Solution

According to an example embodiment, there is provided a method of encoding an audio signal, the method including dividing each of frame of input signal that constitute an audio signal into a plurality of subframes; transforming the subframes to a frequency domain; determining a two-dimensional (2D) intra block using the subframes transformed to the frequency domain; and encoding the 2D intra block. The 2D intra block is a block that two-dimensionally displays frequency coefficients of the subframes transformed to the frequency domain using a time and a frequency.

The transforming of the subframes to the frequency domain may include grouping the subframes based on an overlap-add; applying a window to the grouped subframes; and transforming the subframes to which the window is applied to the frequency domain.

The grouping may include grouping a last subframe divided from a current frame and a first subframe divided from a subsequent frame among the frame of input signal.

The encoding may include dividing each of the subframes of the 2D intra block into a plurality of subband signals; predicting a correlation between the subband signals; quantizing a high band signal of which a bandwidth value is greater than a reference value among the subband signals, using a scale factor; quantizing a prediction result of a low band signal of which a bandwidth value is less than or equal to the reference value among the subband signals and a residual signal between the subband signals; and converting a quantization index, the scale factor, the quantized high band signal, the residual signal, and the prediction result to a bitstream.

According to an example embodiment, there is provided a method of decoding an audio signal, the method including decoding a two-dimensional (2D) intra block from a received bitstream; determining subframes of a frequency domain using the 2D intra block; transforming the subframes of the frequency domain to subframes of a time domain; determining frame of input signal by performing an overlap-add process on the subframes of the time domain; and decoding the audio signal using the frame of input signal.

According to an example embodiment, there is provided a method of encoding an audio signal, the method including grouping frame of input signal that constitute an audio signal based on an overlap-add; applying a window to the grouped frame of input signal; transforming the frame of input signal to which the window is applied to a frequency domain; determining a 2D inter block using the frame of input signal transformed to the frequency domain; and encoding the 2D inter block. The 2D inter block is a block that two-dimensionally displays frequency coefficients of the frame of input signal transformed to the frequency domain using a time and a frequency.

The encoding may include dividing each of the frame of input signal of the 2D inter block into subband signals; predicting a correlation between the subband signals; quantizing each of the subband signals; and calculating a prediction gain based on the correlation and quantizing a residual signal between the subband signals.

According to an example embodiment, there is provided a method of decoding an audio signal, the method including decoding a 2D inter block from a received bitstream; determining frame of input signal of a frequency domain using the 2D inter block; transforming the frame of input signal of the frequency domain to frame of input signal of a time domain; and decoding an audio signal that includes the frame of input signal by performing an overlap-add process on the subframes of the time domain.

According to an example embodiment, there is provided a method of encoding an audio signal, the method including determining a 2D inter block using first frame of input signal that constitute an audio signal; encoding the 2D inter block; restoring second frame of input signal from the encoded 2D inter block; determining a 2D intra block using a residual signal between the second frame of input signal and the first frame of input signal; encoding the 2D intra block; and mixing the encoded 2D inter block and the encoded 2D intra block.

The determining of the 2D inter block may include grouping a plurality of first frame of input signal based on an overlap-add; applying a window to the grouped first frame of input signal; transforming the first frame of input signal to which the window is applied to a frequency domain; and determining a 2D inter block using the first frame of input signal transformed to the frequency domain.

The determining of the 2D intra block may include dividing the residual signal between the second frame of input signal and the first frame of input signal into a plurality of subframes; transforming the subframes to a frequency domain; and determining a 2D intra block using the subframes transformed to the frequency domain.

According to an example embodiment, there is provided a method of decoding an audio signal, the method including decoding a 2D inter block from an encoded 2D inter block; restoring groups of an frame of input signal from the 2D inter block; determining a second frame of input signal by performing an overlap-add process on the restored groups of frame of input signal; decoding a 2D intra block from an encoded 2D intra block; restoring a residual signal from the 2D intra block; and restoring a first frame of input signal that is an original frame of input signal using the residual signal and the second frame of input signal.

According to an example embodiment, there is provided a method of encoding an audio signal, the method including determining 2D intra blocks by dividing each of first frame of input signal that constitute an audio signal into a plurality of first subframes; encoding the 2D intra blocks; restoring second subframes from the encoded 2D intra blocks; determining second frame of input signal by combining the second subframes; determining a 2D inter block using residual signals between the second frame of input signal and the first frame of input signal; encoding the 2D inter block; and mixing the encoded 2D inter block and the encoded 2D intra block.

The encoding of the 2D inter block may include setting first subframes of the 2D intra blocks as a macro block; predicting a correlation between macro blocks; performing a differential pulse code modulation (DPCM) to macro blocks corresponding to a highest predicted correlation; quantizing each of the macro blocks; and calculating a prediction gain based on a result of the DPCM, and quantizing a residual signal between the macro blocks corresponding to the highest correlation.

According to an example embodiment, there is provided a method of decoding an audio signal, the method including decoding a 2D inter block from an encoded 2D inter block; restoring groups of frames of a residual signal from the 2D inter block; determining the residual signal by performing an overlap-add process on the groups of the frames of the residual signal; decoding a 2D intra block from an encoded 2D intra block; determining a second frame of input signal from the 2D intra block; and restoring a first frame of input signal that is an original frame of input signal using the second frame of input signal and the residual signal.

The determining of the second frame of input signal may include determining subframes of a frequency domain using the 2D intra block; transforming the subframes of the frequency domain to subframes of a time domain; and determining a second frame of input signal by performing an overlap-add process on the subframes of the time domain.

According to an example embodiment, there is provided a method of encoding an audio signal, the method including determining 2D intra blocks by dividing each of frame of input signal that constitute an audio signal into a plurality of subframes; determining a 2D inter block using residual signals between the 2D intra blocks and encoded 2D intra blocks; encoding the 2D inter block; and mixing the 2D inter block and the 2D intra block.

According to an example embodiment, there is provided a method of decoding an audio signal, the method including decoding a 2D inter block from an encoded 2D inter block; restoring groups of frames of a residual signal from the 2D inter block; restoring the residual signal by performing an overlap-add process on the groups of the frames of the residual signal; restoring a before-encoding 2D intra block using an encoded 2D intra block and the residual signal; and restoring the audio signal using the before-encoding 2D intra block.

The restoring of the groups of the frames of the residual signal may include determining frames of a frequency domain using the 2D inter block; transforming the frames of the frequency domain to frames of a time domain; and restoring groups of frames that constitute the residual signal by releasing a window from the frames of the time domain.

Effect

According to example embodiments, it is possible to enhance an encoding rate by reconfiguring and encoding an input audio signal as a two-dimensional (2D) signal.

Also, according to example embodiments, since the same framing structure as a video signal may be achieved using an encoding scheme that is interpreted based on a block unit, it is possible to flexibly perform homogeneity and synchronization of an encoding scheme compared to a conventional encoding method.

DETAILED DESCRIPTION OF DRAWINGS

BEST MODE

Hereinafter, example embodiments are described in detail with reference to the accompanying drawings. A method of encoding an audio signal according to an example embodiment may be performed by an audio encoding apparatus. Also, an audio decoding method according to an example embodiment may be performed by an audio decoding apparatus.

Figure 1:
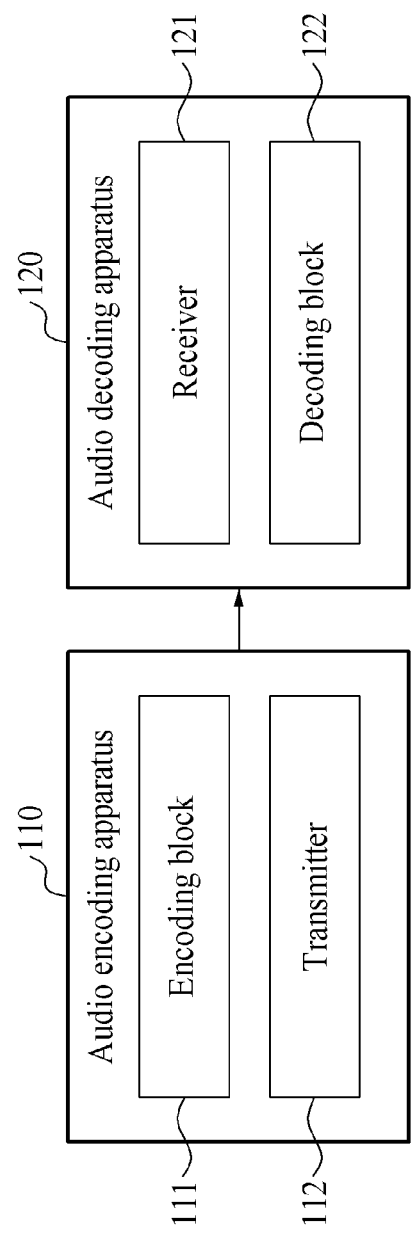
FIG. 1 is a diagram illustrating an audio encoding apparatus and an audio decoding apparatus according to an example embodiment.

FIG. 1 is a diagram illustrating an audio encoding apparatus and an audio decoding apparatus according to an example embodiment.

Referring to FIG. 1, an audio encoding apparatus 100 may include an encoding block 111 and a transmitter 112.

The encoding block 111 may reconfigure an input audio signal as a two-dimensional (2D) signal. The encoding block 111 may encode the input audio signal that is reconfigured as the 2D signal and may output a bitstream.

Here, the encoding block 111 may generate an intra block that is a 2D signal based on an intra block encoding scheme of determining as a block and quantizing at least one of audio frames that constitute the input audio signal, and may encode the intra block. An encoding operation based on the intra block encoding scheme is described with reference to FIGS. 2 through 4.

Also, the encoding block 111 may generate an inter block that is a 2D signal based on an inter block encoding scheme of determining as a block and quantizing audio frames that constitute the input audio signal, and may encode the inter block. An encoding operation based on the inter block encoding scheme is described with reference to FIGS. 7 and 8.

The encoding block 111 may encode the input audio signal using all of the inter block encoding scheme and the intra block encoding scheme.

For example, the encoding block 110 may encode the input audio signal based on the inter block encoding scheme, and may encode a residual signal between the encoded audio signal and a restored audio signal based on the intra block encoding scheme. An operation of applying the inter block encoding scheme and then performing encoding based on the intra block encoding scheme is described with reference to FIGS. 12 and 13.

As another example, the encoding block 110 may encode the input audio signal based on the intra block encoding scheme and may encode a differential signal between a restored audio signal that is restored from the encoded audio signal and an original audio signal based on the inter block encoding scheme. An operation of applying the intra block encoding scheme and then performing encoding based on the inter block encoding scheme is described with reference to FIGS. 16 and 17.

As another example, the encoding block 110 may encode the input audio signal based on the intra block encoding scheme and may encode a differential signal between the encoded audio signal and an original audio signal based on the inter block encoding scheme. An operation of applying the intra block encoding scheme and then encoding the differential signal between the encoded audio signal and the original audio signal based on the inter block encoding scheme is described with reference to FIGS. 20 through 22.

The transmitter 112 may transmit the bitstream output from the encoding block 111 to an audio decoding apparatus 120.

The audio decoding apparatus 120 may decode and output the audio signal from the bitstream that is received from the audio encoding apparatus 110.

A receiver 121 may receive the bitstream from the transmitter 112, and may transfer the bitstream to a decoding block 122. Here, the bitstream received by the receiver 121 may be an inter block bitstream, an intra block bitstream, or a bitstream in which the intra block bitstream and the inter block bitstream are mixed.

The decoding block 122 may decode an output audio signal corresponding to the input audio signal from the bitstream.

Here, when the encoding block 111 performs encoding based on the intra block encoding scheme, the decoding block 122 may synthesize an original intra frame based on an overlap-add and may decode the output audio signal from the original intra frame. An operation of decoding the encoded bitstream based on the intra block encoding scheme is described with reference to FIGS. 5 and 6.

Also, when the encoding block 111 performs encoding based on the inter block encoding scheme, the decoding block 122 may restore frame of input signal using an inter block, may overlap-add the frame of input signal, and may decode the output audio signal. An operation of decoding the encoded bitstream based on the inter block encoding scheme is described with reference to FIGS. 10 and 11.

When the encoding block 111 encodes the input audio signal using all of the inter block encoding scheme and the intra block encoding scheme, the decoding block 122 may decode and combine an inter block bitstream and an intra block bitstream, and may decode the output audio signal. An operation of decoding, by the encoding block 111, the encoded bitstream using all of the inter block encoding scheme and the intra block encoding scheme is described with reference to FIGS. 14, 15, 18, 19, 23, and 24.

Since the audio encoding apparatus 110 reconfigures and encodes the input audio signal as the 2D signal, an encoding efficiency may be enhanced. Also, since the audio encoding apparatus 110 may achieve the same framing structure as a video signal using an encoding scheme that is interpreted based on a block unit, homogeneity and synchronization of the encoding scheme may be flexibly performed compared to an encoding method according to the related art.

Figure 2:
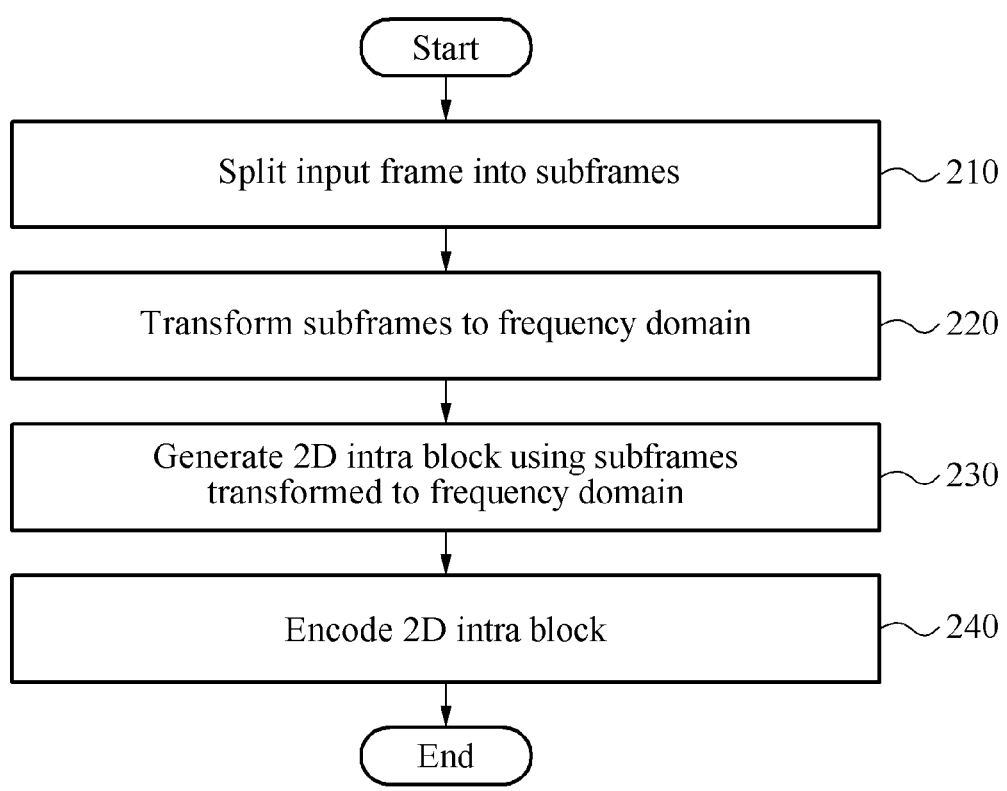
FIG. 2 is a flowchart illustrating a method of encoding an audio signal according to a first example embodiment.

FIG. 2 is a flowchart illustrating a method of encoding an audio signal according to a first example embodiment.

In operation 210, the encoding block 111 may split each of frame of input signal that constitute an audio signal into a plurality of subframes.

In operation 220, the encoding block 111 may transform the subframes split in operation 210 to a frequency domain.

Here, the encoding block 111 may group the subframes based on an overlap-add. The encoding block 111 may apply a window to the grouped subframes. The encoding block 111 may transform the subframes to which the window is applied to the frequency domain.

Here, the encoding block 111 may group a last subframe divided from a current frame and a first subframe divided from a subsequent frame among currently processing frame of input signal.

In operation 230, the encoding block 111 may generate a 2D intra block using the subframes that is transformed to the frequency domain in operation 220.

Here, the 2D intra block may be a block that two-dimensionally displays the frame of input signal in the frequency domain. For example, the 2D intra block may be a block that two-dimensionally displays the frequency coefficients of the subframes transformed to the frequency domain using a time and a frequency.

In operation 240, the encoding block 111 may encode the 2D intra block generated in operation 230. Here, the encoding block 111 may split each of the subframes of the 2D intra block into a plurality of subband signals. The encoding block 111 may predict a correlation between the subband signals.

The encoding block 111 may quantize a high band signal of which a bandwidth value is greater than or equal to a reference value among the subband signals using a scale factor. Also, the encoding block 111 may quantize a prediction result of a low band signal of which a bandwidth value is less than or equal to the reference value among the subband signals and a residual signal between the subband signals.

The encoding block 111 may convert a quantization index, the scale factor, the quantized high band signal, the residual signal, and the prediction result to a bitstream.

Figure 3:
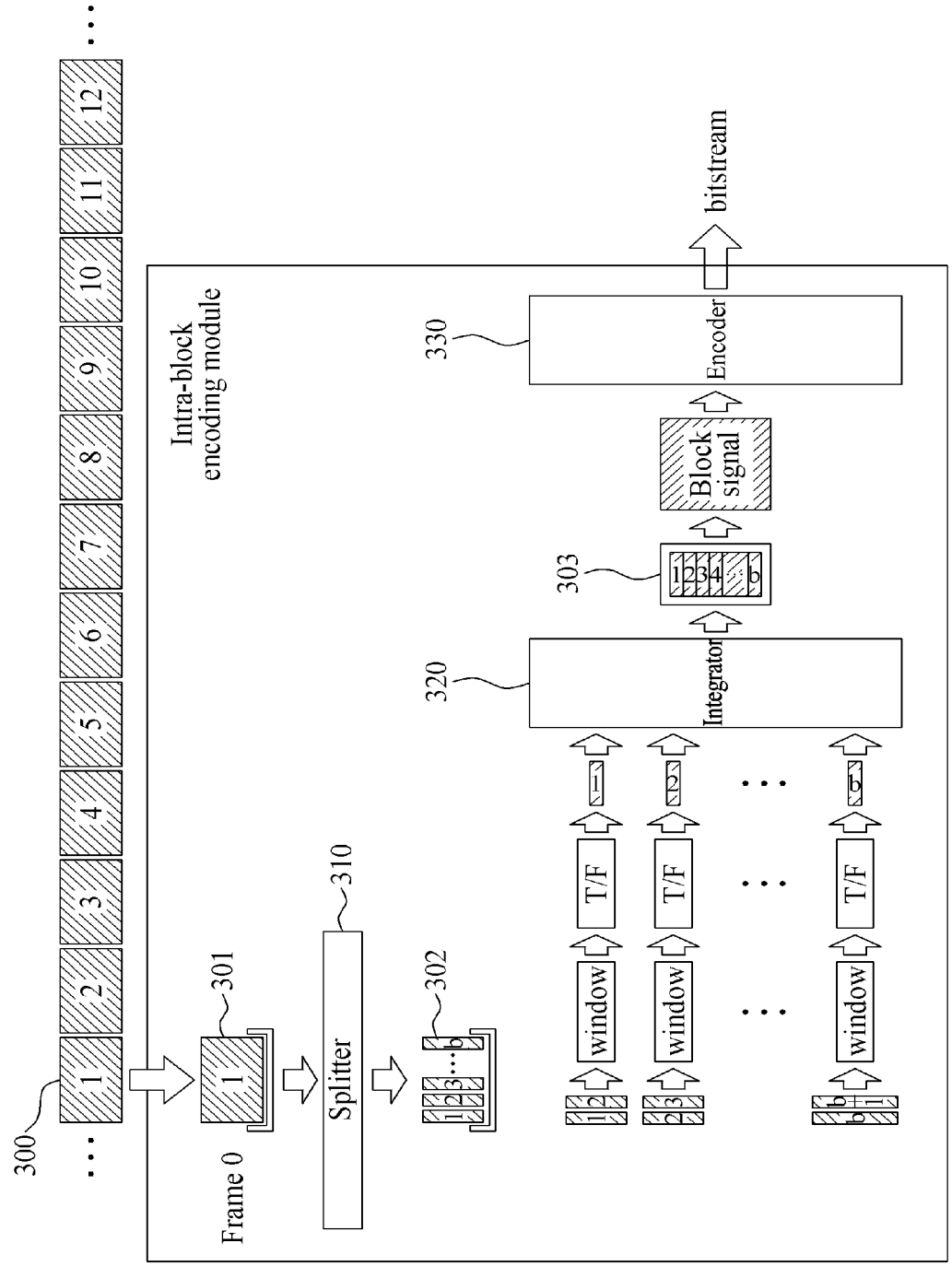
FIG. 3 illustrates an example of an audio encoding process according to the first example embodiment.

FIG. 3 illustrates an example of an audio encoding process according to the first example embodiment.

In FIG. 3, a signal indicated with/hatching may be an audio signal of a time domain and a signal indicated with \ hatching may be an audio signal of a frequency domain.

Referring to FIG. 3, an input audio signal 300 may include a plurality of frame of input signal 301. Here, an frame of input signal may be a one-dimensional (1D) audio frame. For example, the frame of input signal may be an intra frame.

The encoding block 111 may split the frame of input signal 310 into a plurality of subframe 302 using a splitter 310.

The encoding block 111 may group the subframes 302 based on an overlap-add. For example, the encoding block 111 may group the subframes 302 by two based on 50% overlap-add to perform an overlap-add process on the subframes 302. In detail, the encoding block 111 may group a first subframe 1 and a second subframe 2 of a current frame among the frame of input signal. Next, the encoding block 111 may group the second subframe 2 and a third subframe 3 of the current frame among the frame of input signal. That is, the encoding block 111 may group subframes so that a portion of subframes included in a group may be overlap-addpingly included in another group.

Also, the encoding block 111 may group b that is a last subframe of the current frame and b+1 that is a first frame of a subsequent frame for connection between the current frame and the subsequent frame among the frame of input signal.

The encoding block 111 may apply a window to the grouped subframes. For example, the encoding block 111 may apply a sine window or a Kaiser Bessel window to the grouped subframes.

The encoding block 111 may transform the subframes to which the window is applied to a frequency domain. Here, the encoding block 111 may transform the subframes to the frequency domain by applying a modified discrete cosine transform (MDCT) to the subframes to which the window is applied based on 50% overlap-add.

The encoding block 111 may input the subframes 320 transformed to the frequency domain to an integrator 320, and may generate a 2D intra block 303.

For example, when a number of frequency coefficients of the subframes 320 transformed to the frequency domain is N, a time axis resolution is W, and a frequency resolution is H, the 2D intra block 303 may be represented by N=W×H. Here, W denotes a width of the 2D intra block 303 and H denotes a height of the 2D intra block 303.

The encoding block 111 may quantize a single 2D intra block 303 instead of quantizing each of the subframes. Thus, it is possible to enhance an encoding efficiency compared to a scheme of independently quantizing the subframes.

Here, the encoding block 111 may perform quantization by predicting a correlation between the subframes 302 from the 2D intra block 303 and by minimizing an amount of information of the 2D intra block 303. A method of quantizing the 2D intra block 303 is described with reference to FIG. 4.

The encoding block 111 may perform entropy encoding/decoding on the quantization index and related information using an encoder 330, and may output a bitstream.

Figure 4:
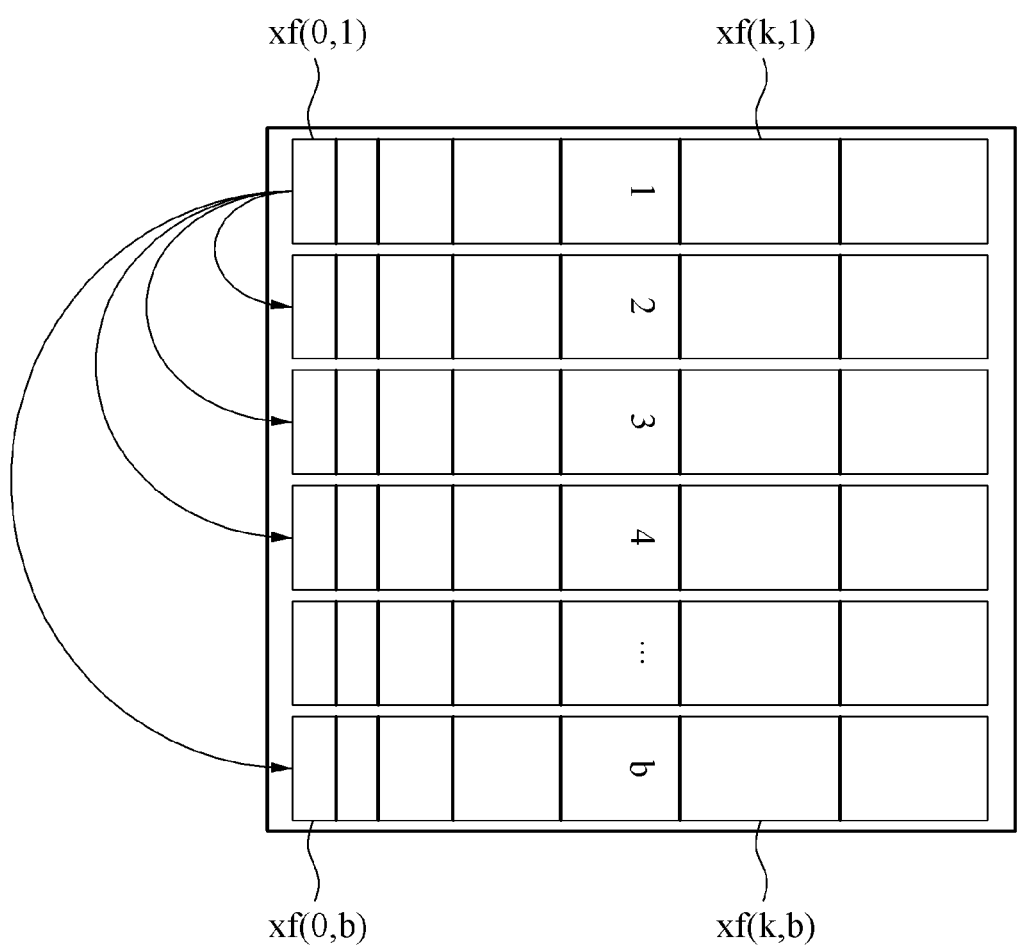
FIG. 4 illustrates an example of a quantization method according to the first example embodiment.

FIG. 4 illustrates an example of a quantization method according to the first example embodiment.

The encoding block 111 may split each of subframes of a 2D intra block into a plurality of subband signals. For example, referring to FIG. 4, a subframe 1 of the 2D intra block may be split into subband xf(0,1) to subband xf(k,1). Here, an index k denotes a number of subbands.

The encoding block 111 may predict a correlation between subband signals. For example, the encoding block 111 may perform a primary prediction using a differential pulse code modulation (DPCM) scheme or may perform a high-order prediction using a linear prediction coefficient (LPC) scheme.

The encoding block 111 may perform a coarse quantization on a high band signal of which a bandwidth value is greater than a reference value among the subband signals, using a scale factor. For example, the reference value may be 4 kHz.

Also, the encoding block 111 may quantize a prediction result of a low band signal of which a bandwidth value is less than or equal to the reference value among the subband signals and a residual signal between the subband signals. Here, the encoding block 111 may perform conversion to the bitstream by applying a lossless compression process to a number of quantized low band predictions and the residual signal.

The encoding block 111 may convert the quantization index to the bitstream using a lossless compression scheme, for example, an entropy coding scheme. Also, the quantization index may be converted to the bitstream by quantizing the scale factor separate from the quantization applied to the high band signal and the quantization index and by performing the lossless compression process.

Figure 5:
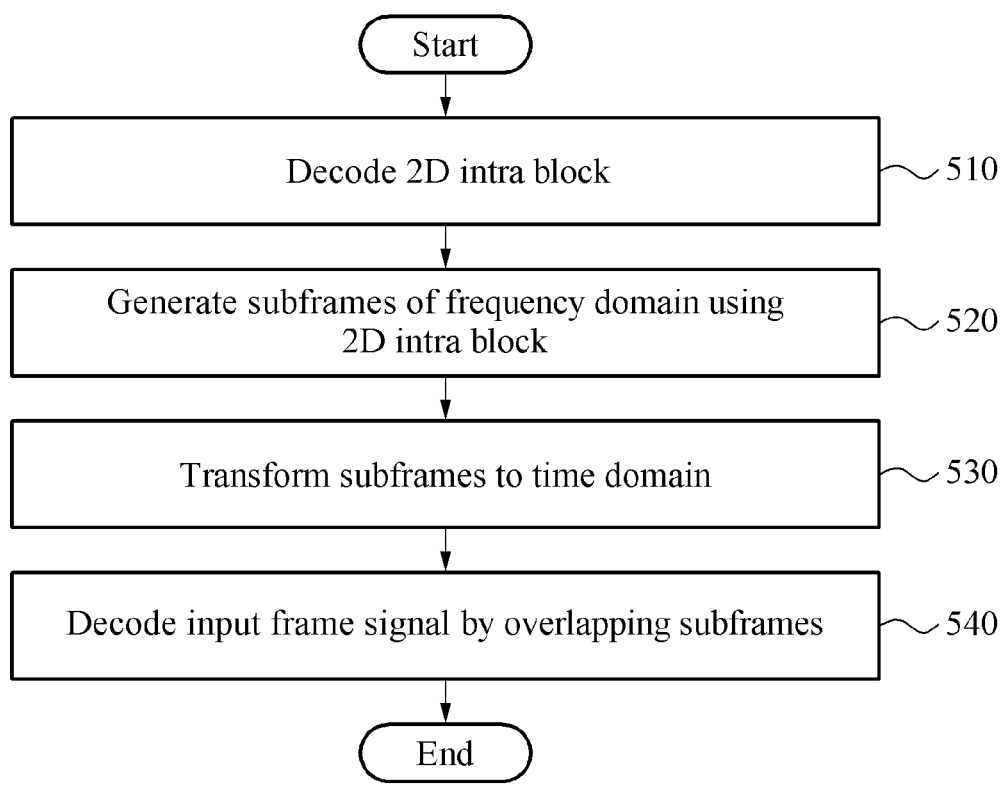
FIG. 5 is a flowchart illustrating an audio decoding method according to the first example embodiment.

FIG. 5 is a flowchart illustrating an audio decoding method according to the first example embodiment.

In operation 510, the decoding block 122 may decode a 2D intra block from a bitstream received by the receiver 121.

In operation 520, the decoding block 122 may generate subframes of a frequency domain using the 2D intra block decoded in operation 510.

In operation 530, the decoding block 122 may transform the subframes of the frequency domain generated in operation 520 to subframes of a time domain.

In operation 540, the decoding block 122 may generate an frame of input signal by performing an overlap-add process on the subframes of the time domain transformed in operation 520.

Here, the decoding block 122 may restore grouped subframes by releasing a window from the subframes of the time domain. The decoding block 122 may perform the overlap-add process on the subframes included in the group.

Also, the decoding block 122 may decode an output audio signal using frame of input signal.

Figure 6:
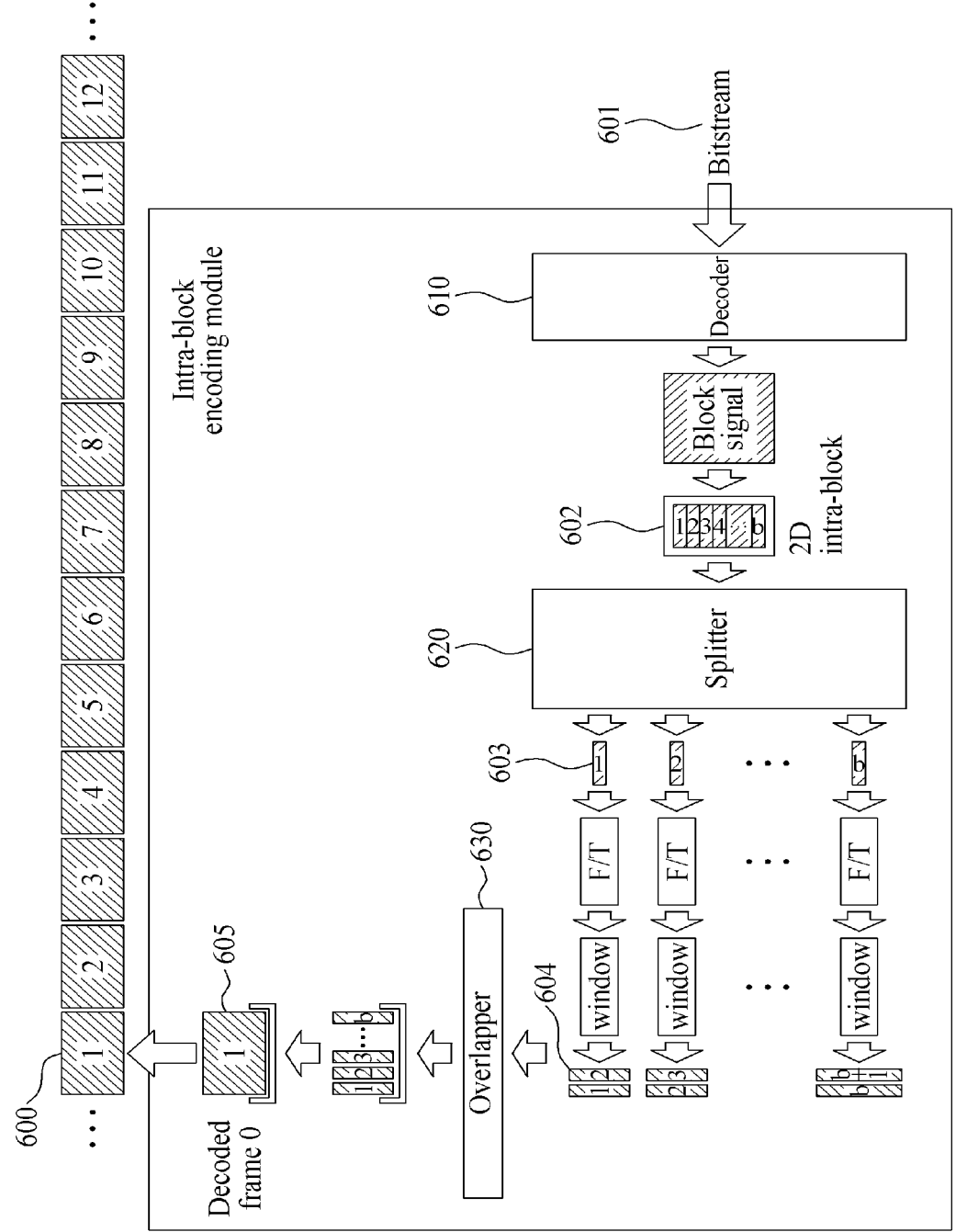
FIG. 6 illustrates an example of an audio decoding process according to the first example embodiment.

FIG. 6 illustrates an example of an audio decoding process according to the first example embodiment.

The decoding block 122 may decode a 2D intra block 602 from a bitstream 601 using a decoder 610.

The decoding block 122 may split the 2D intra block 602 using a splitter 620, and may generate subframes 603 of a frequency domain.

The decoding block 122 may transform the subframes of the frequency domain to subframes of a time domain. Here, the decoding block 122 may restore grouped subframes 604 by releasing a window from the subframes of the time domain. The decoding block 122 may perform an overlap-add process on subframes included in a group using an overlap-addper 630. For example, the decoding block 122 may generate an frame of input signal 605 that includes subframe 1, subframe 2, and subframe 3 by performing an overlap-add process on a group that includes the subframe 1 and the subframe 2 and a group that includes the subframe 2 and the subframe 3.

Here, b+1 that is a first frame of a subsequent frame grouped with b that is a last frame of a current frame may be overlap-addpingly added to a first group of the subsequent frame. In detail, a last group (b, b+1) of the current frame may be overlap-addpingly added to a first group (b+1, b+2) of the subsequent frame.

Referring to FIG. 6, the decoding block 122 may decode an output audio signal 600 that includes the frame of input signal 605 by sequentially determining the frame of input signal 605 through iteration of the aforementioned processes.

Figure 7:
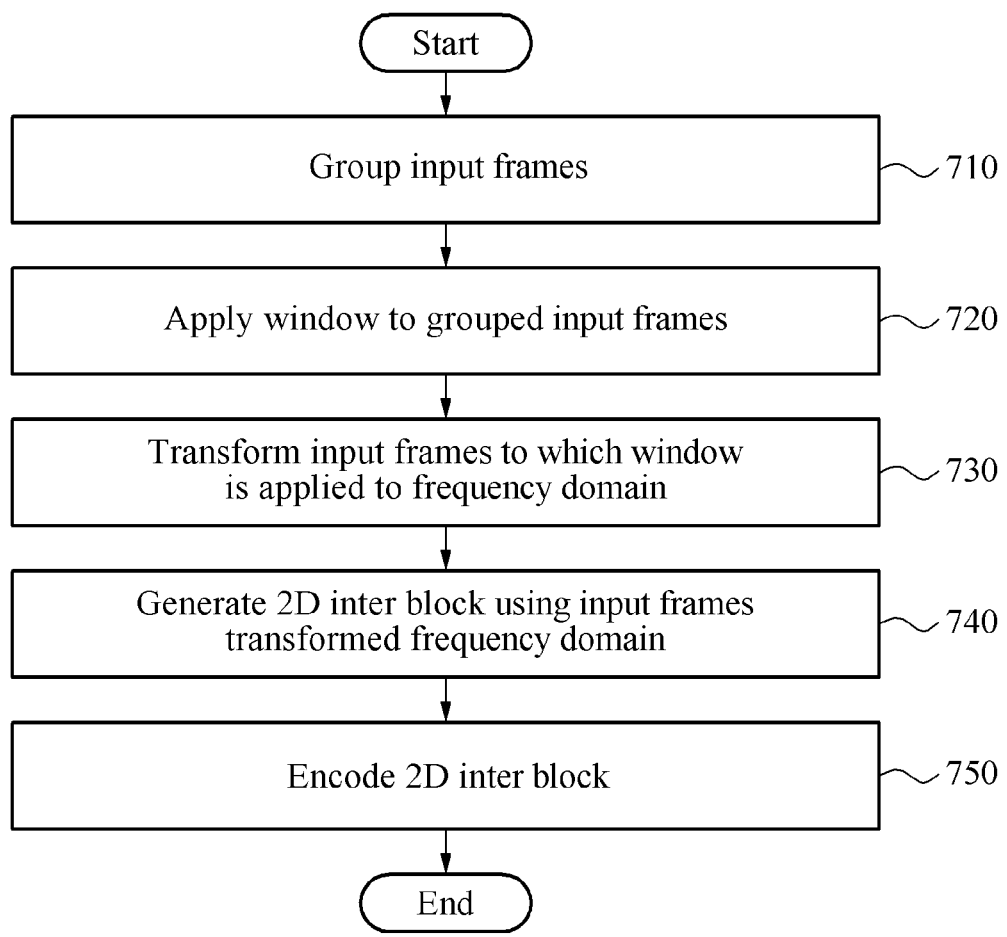
FIG. 7 is a flowchart illustrating a method of encoding an audio signal according to a second example embodiment.

FIG. 7 is a flowchart illustrating a method of encoding an audio signal according to a second example embodiment.

In operation 710, the encoding block 111 may group frame of input signal that constitute an audio signal based on an overlap-add. Here, the encoding block 111 may group the frame of input signal by two based on 50% overlap-add to perform an overlap-add process on the frame of input signal.

In operation 720, the encoding block 111 may apply a window to the frame of input signal grouped in operation 710.

In operation 730, the encoding block 111 may transform the frame of input signal to which the window is applied in operation 720 to a frequency domain. Here, the encoding block 111 may transform the frame of input signal to the frequency domain by applying an MDCT to the frame of input signal to which the window is applied based on 50% overlap-add.

In operation 740, the encoding block 111 may generate a 2D inter block using the frame of input signal transformed to the frequency domain in operation 730. Here, the 2D inter block may be a block that two-dimensionally displays frequency coefficients of the frame of input signal transformed to the frequency using a time and a frequency.

In operation 750, the encoding block 111 may encode the 2D inter block generated in operation 740.

Here, the encoding block 111 may split each of the frame of input signal of the 2D inter block into subband signals. The encoding block 111 may predict a correlation between the subband signals. The encoding block 111 may quantize each of the subband signals. The encoding block 111 may calculate a prediction gain based on the correlation and may quantize a residual signal between the subband signals.

Figure 8:
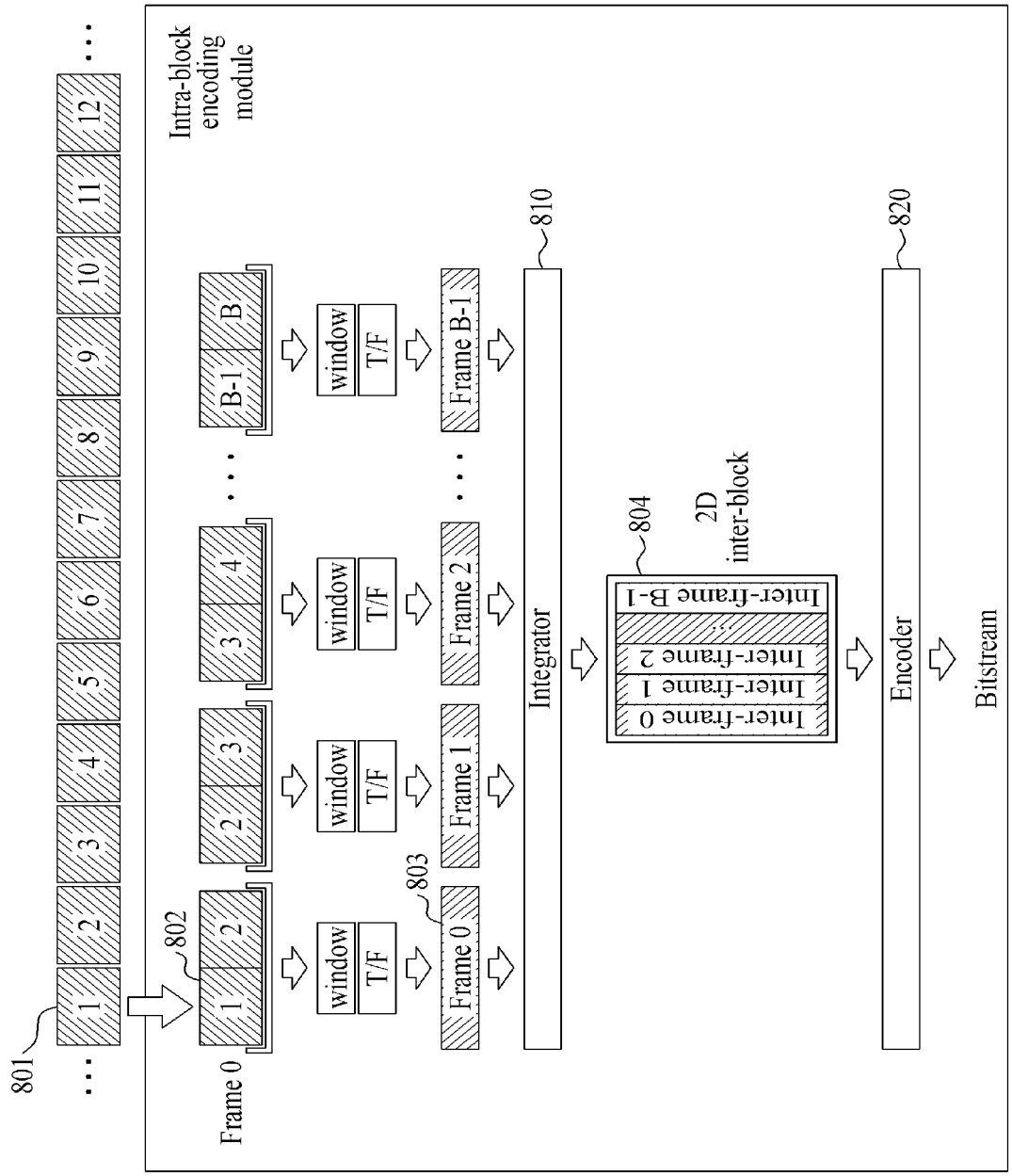
FIG. 8 illustrates an example of an audio encoding process according to the second example embodiment.

FIG. 8 illustrates an example of an audio encoding process according to the second example embodiment.

In FIG. 8, a signal indicated with/hatching may be an audio signal of a time domain and a signal indicated with \ hatching may be an audio signal of a frequency domain.

Referring to FIG. 8, an input audio signal may include a plurality of frame of input signal 801.

The encoding block 111 may generate groups 802 by grouping frame of input signal that constitute an audio signal by two or more based on an overlap-add. Here, the encoding block 111 may group the frame of input signal by two based on 50% overlap-add to perform an overlap-add process on the frame of input signal.

The encoding block 111 may apply a window to the groups 802. For example, the encoding block 111 may apply a sine window or a Kaiser Bessel window to the groups 802.

The encoding block 111 may transform the frame of input signal to which the window is applied, from a time domain to the frequency domain. Here, the encoding block 111 may transform the frame of input signal to the frequency domain by applying an MDCT to the frame of input signal to which the window is applied based on 50% overlap-add.

The encoding block 111 may input frame of input signal 803 transformed to the frequency domain to an integrator 810, and may generate a 2D inter block 804. Here, the 2D inter block may be a block that two-dimensionally displays frequency coefficients of the frame of input signal transformed to the frequency domain using a time and a frequency.

The encoding block 111 may quantize a single 2D inter block 804 instead of quantizing each of the frame of input signal 801. Thus, it is possible to enhance an encoding efficiency compared to a scheme of independently quantizing the frame of input signal 801.

Here, the encoding block 111 may perform quantization by predicting a correlation between the frame of input signal 801 from the 2D inter block 804 and by minimizing an amount of information of the 2D inter block 804. A method of quantizing the 2D inter block 804 is described with reference to FIG. 9.

The encoding block 111 may perform entropy encoding/decoding on a quantization index and related information using an encoder 330, and may output a bitstream.

Figure 9:
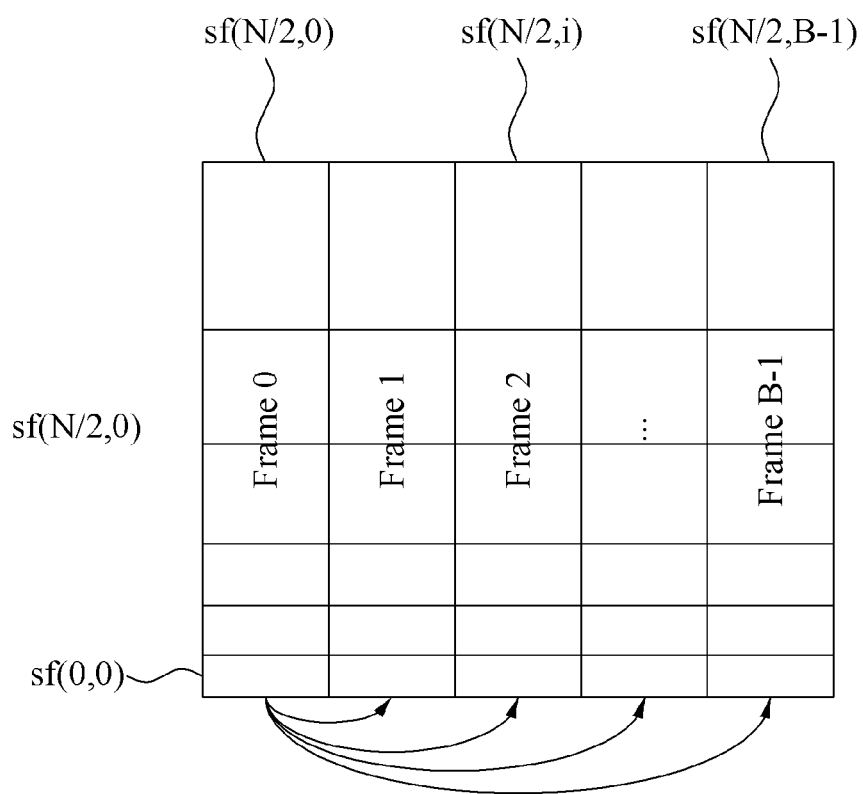
FIG. 9 illustrates an example of a quantization method according to the second example embodiment.

FIG. 9 illustrates an example of a quantization method according to the second example embodiment.

The encoding block 111 may split each of frame of input signal of a 2D inter block into subband signals. For example, referring to FIG. 9, an frame of input signal (Frame 0) of the 2D inter block may be split into subband sf(0, 0) to subband sf(N/2, 0). Here, N denotes a number of frequency coefficients.

The encoding block 111 may quantize each of the subband signals. Here, the encoding block 111 may predict a correlation between the subband signals.

The encoding block 111 may calculate a prediction gain based on the correlation and may quantize a residual signal between the subband signals. Here, the encoding block 111 may calculate the prediction gain using a DPCM scheme and an LPC scheme.

The encoding block 111 may perform quantization by applying a scale factor to the residual signal and may perform lossless compression.

Figure 10:
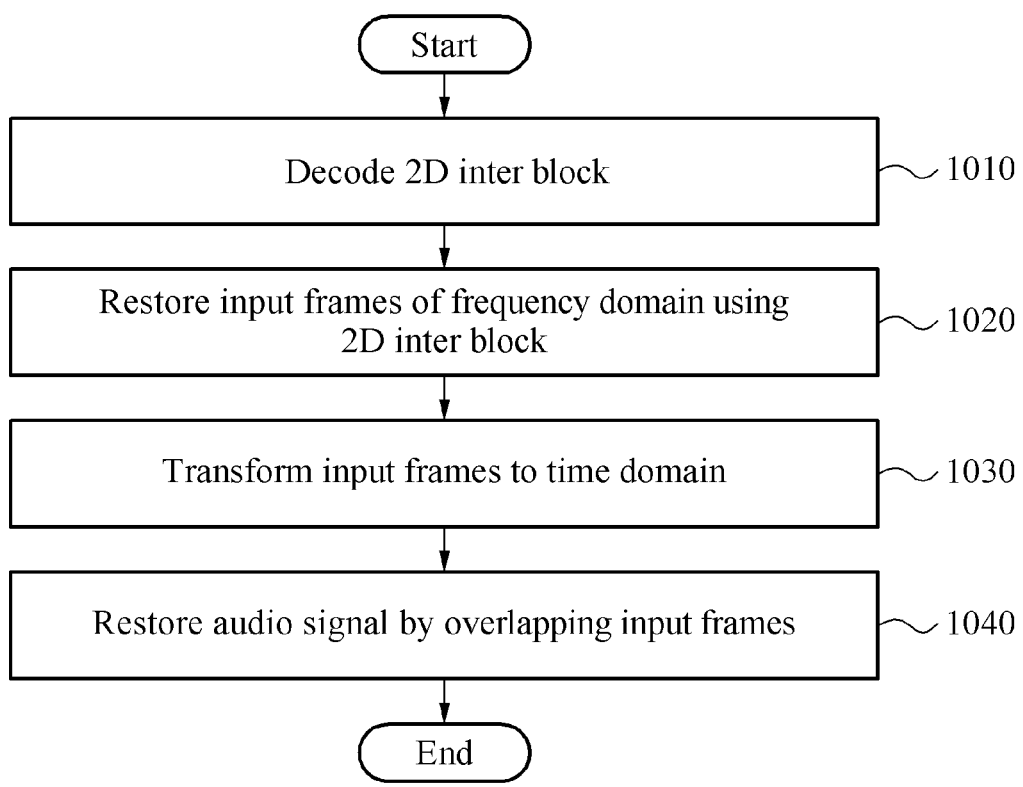
FIG. 10 is a flowchart illustrating an audio decoding method according to the second example embodiment.

FIG. 10 is a flowchart illustrating an audio decoding method according to the second example embodiment.

In operation 1010, the decoding block 122 may decode a 2D inter block from a bitstream received by the receiver 121.

In operation 1020, the decoding block 122 may decode frame of input signal of a frequency domain using the 2D inter block decoded in operation 1010.

In operation 1030, the decoding block 122 may transform the frame of input signal of the frequency domain decoded in operation 1020 to frame of input signal of a time domain. Here, the decoding block 122 may restore groups of frame of input signal by releasing a window from the frame of input signal of the time domain.

In operation 1040, the decoding block 122 may decode an original frame of input signal that constitutes an audio signal by performing an overlap-add process on a group of the frame of input signal of the time domain transformed in operation 1020. Also, the decoding block 122 may decode an output audio signal using the original frame of input signal.

Figure 11:
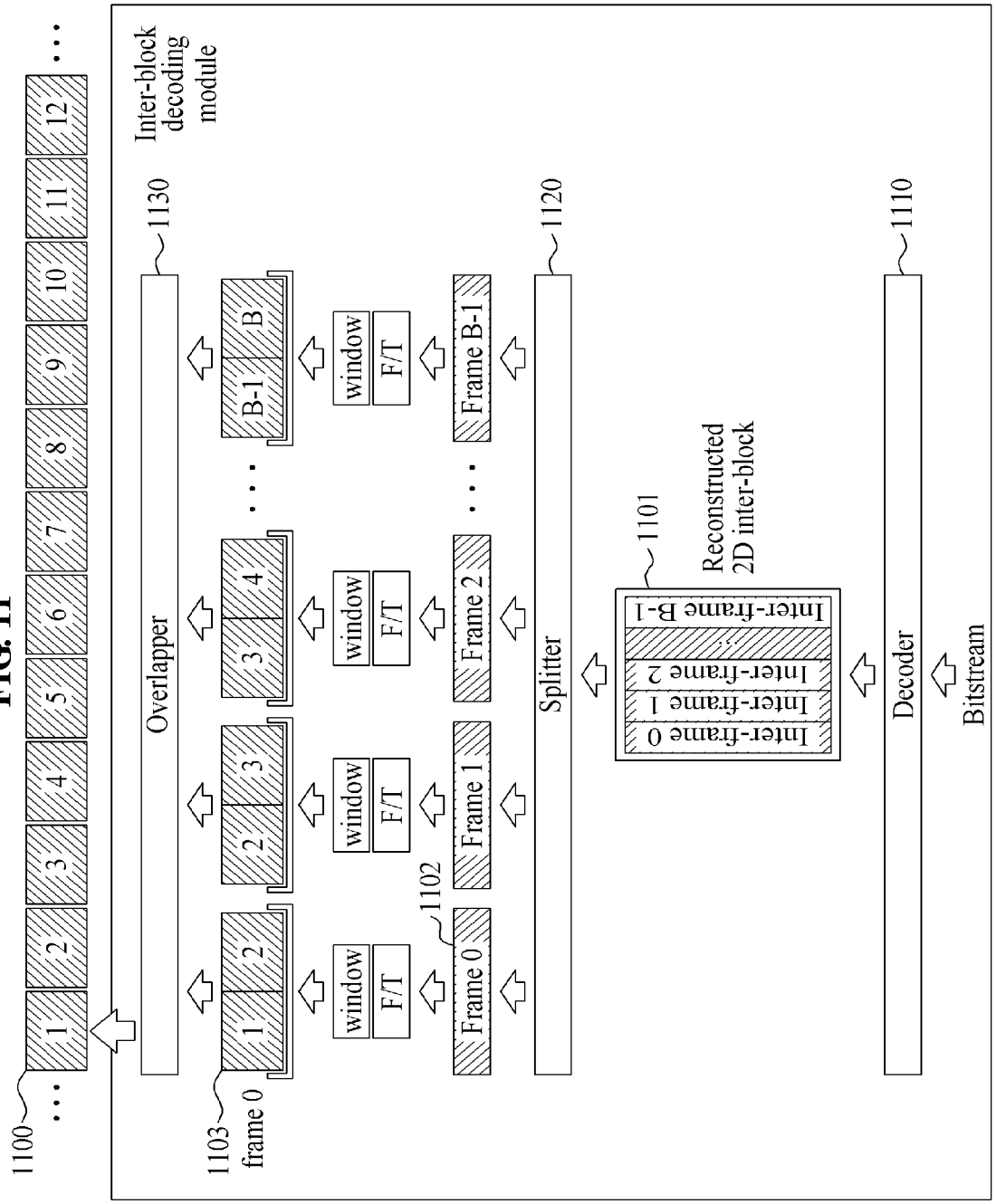
FIG. 11 illustrates an example of an audio decoding process according to the second example embodiment.

FIG. 11 illustrates an example of an audio decoding process according to the second example embodiment.

The decoding block 122 may decode a 2D inter block 1101 from a bitstream using a decoder 1110.

The decoding block 122 may generate frame of input signal 1102 of a frequency domain by dividing the 2D inter block 1101 using a splitter 1120.

The decoding block 122 may transform the frame of input signal 1102 of the frequency domain to frame of input signal of a time domain. Here, the decoding block 122 may restore groups 1103 of the frame of input signal by releasing a window from the frame of input signal of the time domain. The decoding block 122 may restore an audio signal 1100 that includes frame of input signal by performing an overlap-add process on the groups 1103 using an overlap-addper 1130.

Figure 12:
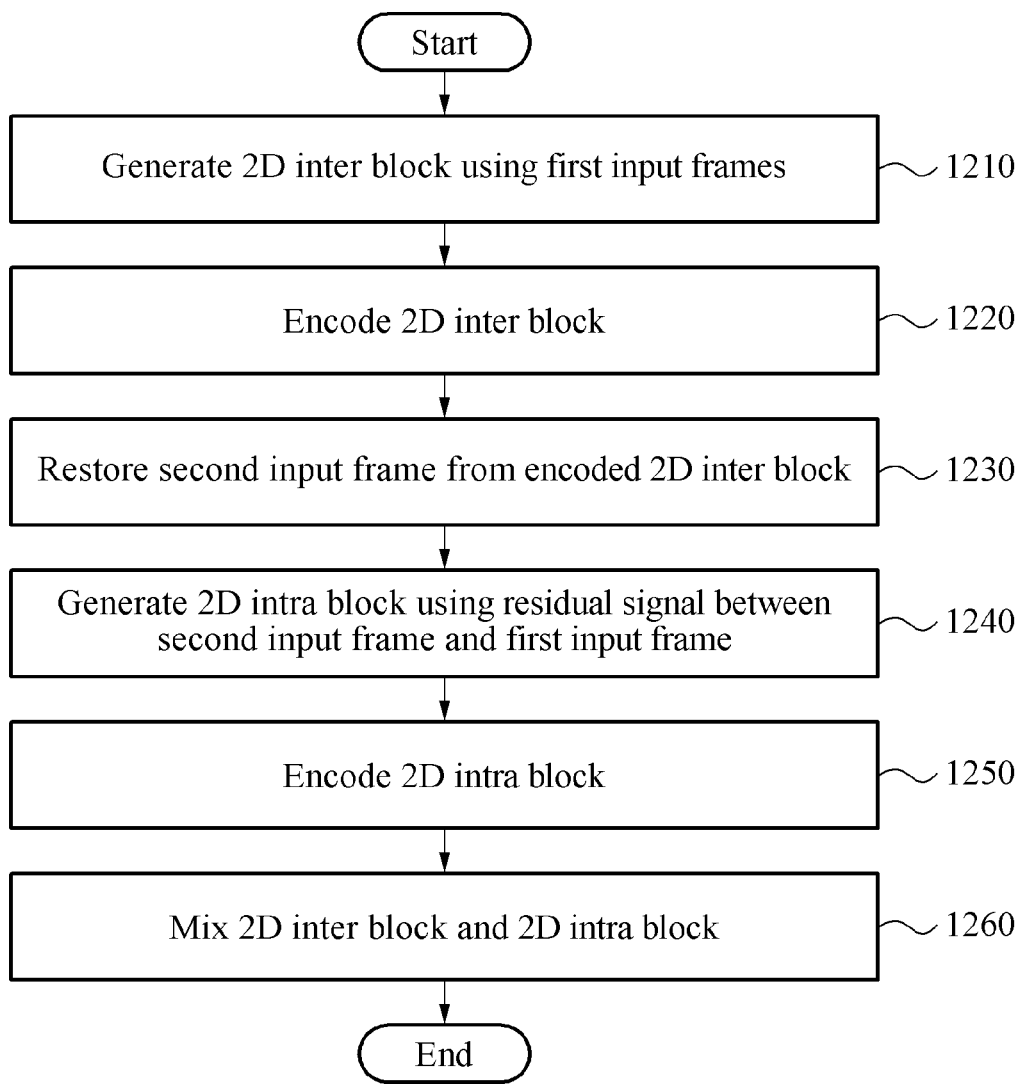
FIG. 12 is a flowchart illustrating a method of encoding an audio signal according to a third example embodiment.

FIG. 12 is a flowchart illustrating a method of encoding an audio signal according to a third example embodiment.

In operation 1210, the encoding block 111 may generate a 2D inter block using first frame of input signal that constitute an audio signal.

Here, the encoding block 111 may group the plurality of first frame of input signal based on an overlap-add. The encoding block 111 may apply a window to the grouped first frame of input signal. The encoding block 111 may transform the first frame of input signal to which the window is applied to a frequency domain. The encoding block 111 may generate the 2D inter block using the first frame of input signal transformed to the frequency domain.

In operation 1220, the encoding block 111 may encode the 2D inter block generated in operation 1210.

In operation 1230, the encoding block 111 may restore second frame of input signal from the 2D inter block encoded in operation 1220. Here, the second frame of input signal may be a result of performing a decoding process on the 2D inter block encoded in operation 1220.

In operation 1240, the encoding block 111 may generate a 2D intra block using a residual signal between the second frame of input signal restored in operation 1230 and the first frame of input signal.

Here, the encoding block 111 may split the residual signal between the second frame of input signal and the first frame of input signal into a plurality of subframes. The encoding block 111 may transform the subframes to a frequency domain. The encoding block 111 may generate a 2D intra block using the subframes transformed to the frequency domain.

In operation 1250, the encoding block 111 may encode the 2D intra block generated in operation 1240.

In operation 1260, the encoding block 111 may mix the 2D inter block encoded in operation 1250 and the 2D intra block encoded in operation 1220 and may convert a mixture thereof to a bitstream.

Figure 13:
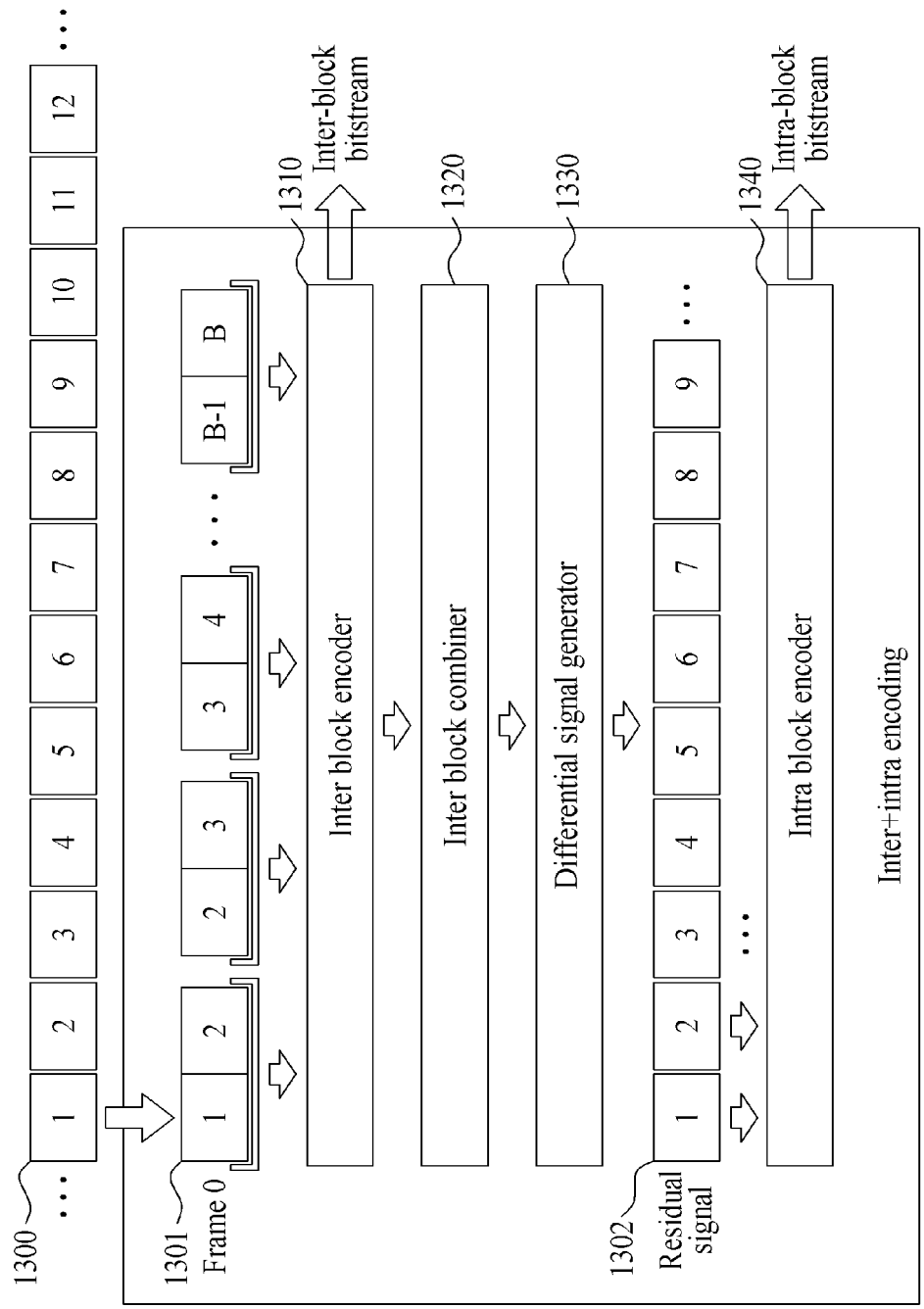
FIG. 13 illustrates an example of an audio encoding process according to the third example embodiment.

FIG. 13 illustrates an example of an audio encoding process according to the third example embodiment.

Referring to FIG. 13, an input audio signal 1300 may include a plurality of first frame of input signal 1301.

The encoding block 111 may group the plurality of first frame of input signal 1301 based on an overlap-add. Here, the encoding block 111 may apply a window to the grouped first frame of input signal. The encoding block 111 may transform the first frame of input signal to which the window is applied to a frequency domain. The encoding block 111 may generate a 2D inter block using the first frame of input signal transformed to the frequency domain.

The encoding block 111 may encode the 2D inter block using an inter block encoder 1310. Here, the inter block encoder 1310 may convert the encoded 2D inter block to an inter block bitstream and may output the converted inter block bitstream.

The encoding block 111 may restore second frame of input signal from the 2D inter block using an inter block combiner 1320. In detail, the encoding block 111 may generate the second frame of input signal by performing a decoding process of dividing an inter block into a plurality of frame of input signal and by combining the frame of input signal.

The encoding block 111 may generate a residual signal 1302 between the second frame of input signal and the first frame of input signal using a differential signal generator 1330.

The encoding block 111 may generate a 2D intra block using the residual signal 1302. Here, the encoding block 111 may split the residual signal between the second frame of input signal and the first frame of input signal into a plurality of subframes. The encoding block 111 may transform the subframes to a frequency domain. The encoding block 111 may generate the 2D intra block using the subframes transformed to the frequency domain.

The encoding block 111 may encode the 2D intra block using an intra block encoder 1340. Here, the intra block encoder 1340 may convert the encoded 2D intra block to an intra block bitstream and may output the converted intra block bitstream.

The transmitter 112 may mix the inter block bitstream and the intra block bitstream into a single bitstream, and may transmit the mixed bitstream to the audio decoding apparatus 120.

Figure 14:
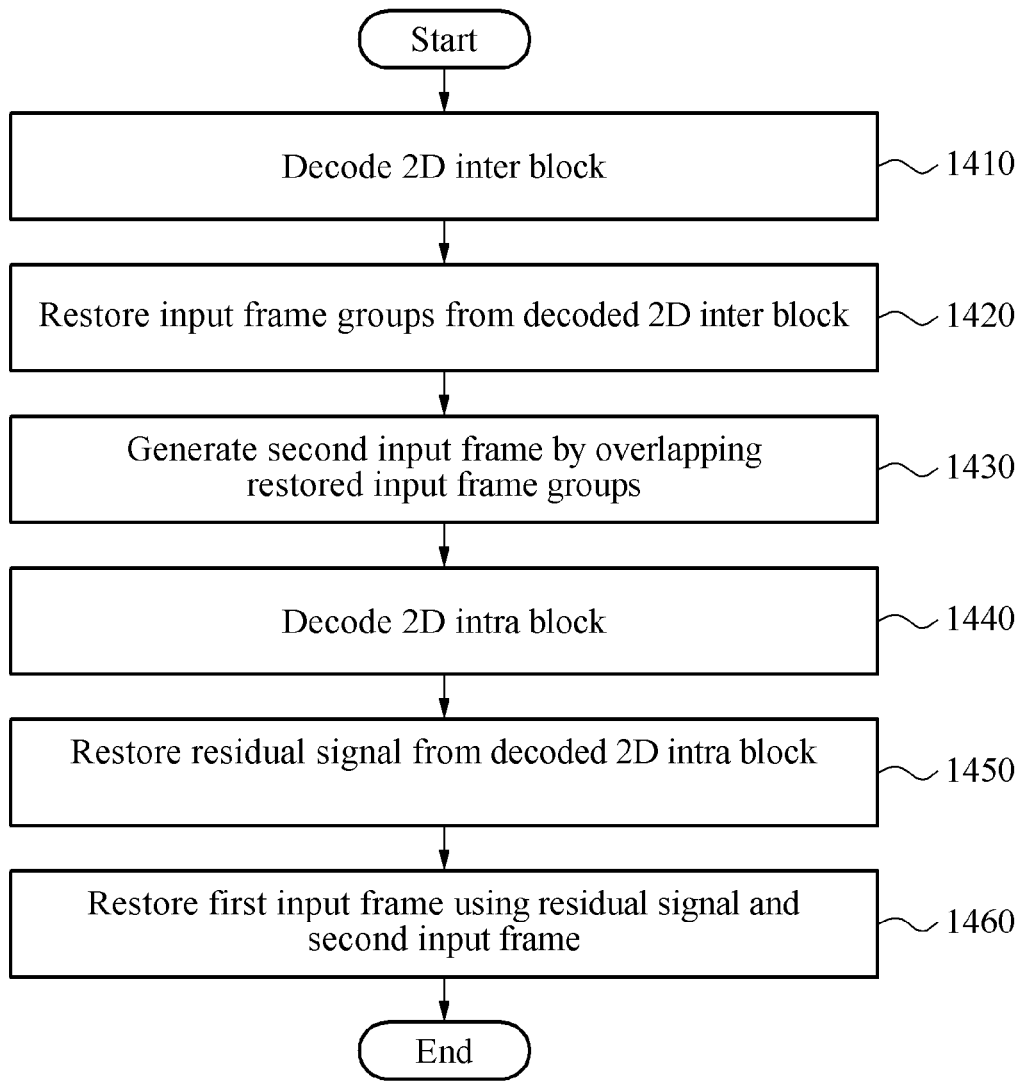
FIG. 14 is a flowchart illustrating an audio decoding method according to the third example embodiment.

FIG. 14 is a flowchart illustrating an audio decoding method according to the third example embodiment.

In operation 1410, the decoding block 122 may extract an encoded 2D inter block and an encoded 2D intra block from a bitstream. The decoding block 122 may decode a 2D inter block from the encoded 2D inter block.

In operation 1420, the decoding block 122 may restore groups of frame of input signal from the 2D inter block decoded in operation 1410. Here, the decoding block 122 may generate frame of input signal of a frequency domain using the decoded 2D inter block in operation 1420. The decoding block 122 may transform the frame of input signal of the frequency domain to frame of input signal of a time domain. Here, the decoding block 122 may restore groups of frame of input signal by releasing a window from the frame of input signal of the time domain.

In operation 1430, the decoding block 122 may generate a second frame of input signal by performing an overlap-add process on the groups of frame of input signal restored in operation 1420.

In operation 1440, the decoding block 122 may decode a 2D intra block from an encoded 2D intra block.

In operation 1450, the decoding block 122 may restore a residual signal from the 2D intra block restored in operation 1440. Here, the decoding block 122 may generate subframes of the frequency domain using the 2D intra block. The decoding block 122 may transform subframes of the frequency domain to subframes of the time domain. The decoding block 122 may generate the residual signal by performing an overlap-add process on the subframes of the time domain.

In operation 1460, the decoding block 122 may restore a first frame of input signal that is an original frame of input signal using the residual signal generated in operation 1450 and the second frame of input signal generated in operation 1430. Here, the residual signal may be a difference between the second frame of input signal that is an frame of input signal restored from the encoded 2D inter block, as generated in operation 1240, and the first frame of input signal that is an original frame of input signal.

Accordingly, the decoding block 122 may restore the first frame of input signal by adding the residual signal to the second frame of input signal.

Figure 15:
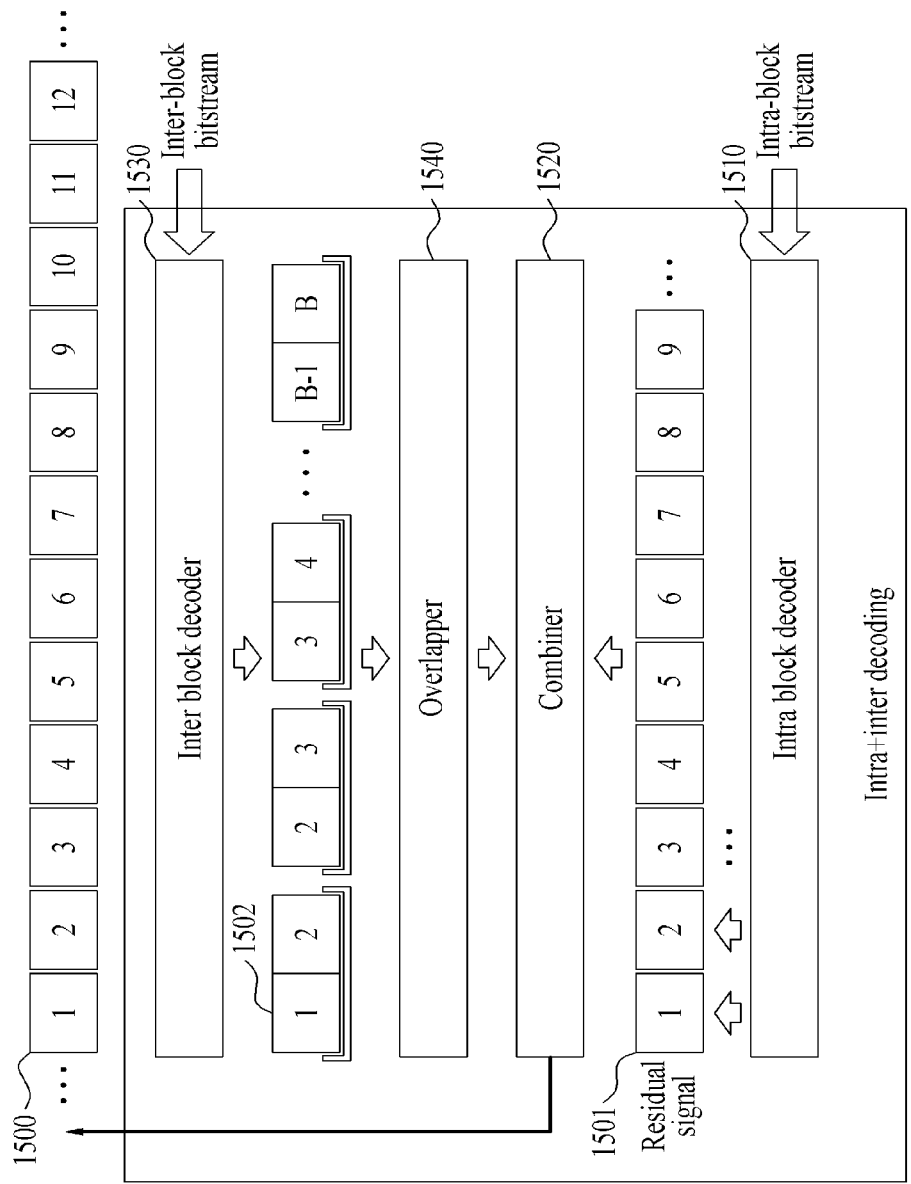
FIG. 15 illustrates an example of an audio decoding process according to the third example embodiment.

FIG. 15 illustrates an example of an audio decoding process according to the third example embodiment.

The decoding block 122 may receive an intra block bitstream converted from an encoded 2D intra block. The decoding block 122 may decode a 2D inter block from the inter block bitstream using an intra block decoder 1510.

Here, the decoding block 122 may restore a residual signal 1501 from the 2D intra block decoded in operation 1440.

Also, the decoding block 122 may receive an inter block bitstream converted from an encoded 2D inter block. The decoding block 122 may decode the 2D inter block from the inter block bitstream using an inter block decoder 1530.

The decoding block 122 may restore groups 1502 of an frame of input signal from the decoded 2D inter block.

The decoding block 122 may generate a second frame of input signal by performing an overlap-add process on the groups 1502 of frame of input signal.

The decoding block 122 may decode an audio signal 1500 that includes first frame of input signal by adding the residual signal 1501 to the second frame of input signal using a combiner 1520.

Figure 16:
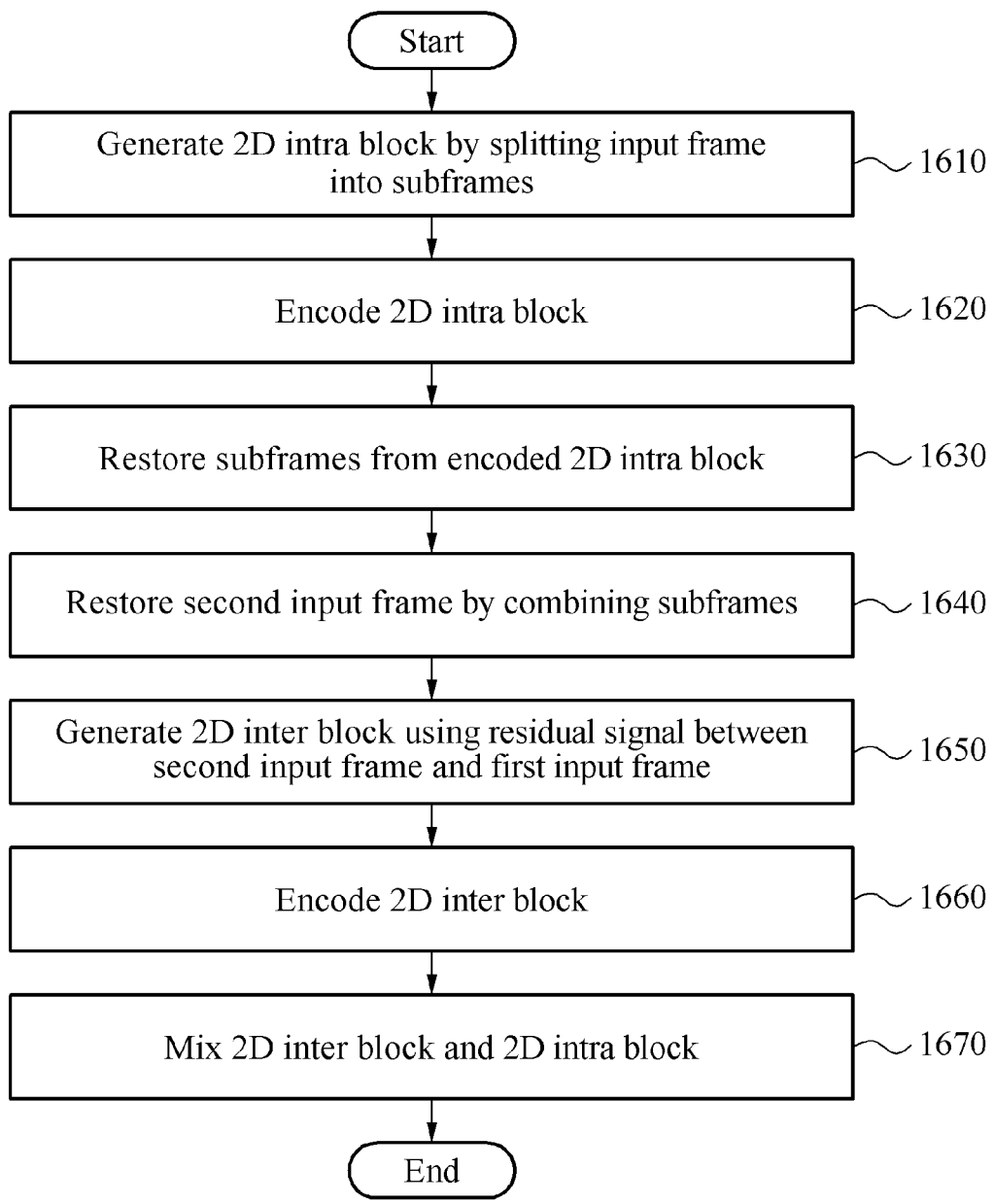
FIG. 16 is a flowchart illustrating a method of encoding an audio signal according to a fourth example embodiment.

FIG. 16 is a flowchart illustrating a method of encoding an audio signal according to a fourth example embodiment.

In operation 1610, the encoding block 111 may generate 2D intra blocks by dividing each of first frame of input signal that constitute an audio signal into a plurality of first subframes.

In operation 1620, the encoding block 111 may encode the 2D intra blocks generated in operation 1610.

Here, the encoding block 111 may set first subframes of the 2D intra blocks to a macro block. The encoding block 111 may predict a correlation between macro blocks. The encoding block 111 may perform a DPCM on macro blocks corresponding to a highest predicted correlation. The encoding block 111 may quantize each of the macro blocks. The encoding block 111 may calculate a prediction gain based on a result of the DPCM and may quantize a residual signal between the macro blocks corresponding to the highest correlation.

In operation 1630, the encoding block 111 may restore second subframes from the 2D intra blocks encoded in operation 1620.

In operation 1640, the encoding block 111 may generate second frame of input signal by combining the second subframes restored in operation 1630.

In operation 1650, the encoding block 111 may generate residual signals between the second frame of input signal generated in operation 1640 and the first frame of input signal. The encoding block 111 may generate a 2D inter block using the residual signals between the second frame of input signal and the first frame of input signal.

In operation 1660, the encoding block 111 may encode the 2D inter block generated in operation 1650.

In operation 1670, the encoding block 111 may output a bitstream in which the 2D inter block encoded in operation 1660 and the 2D intra block encoded in operation 1620 are mixed.

Figure 17:
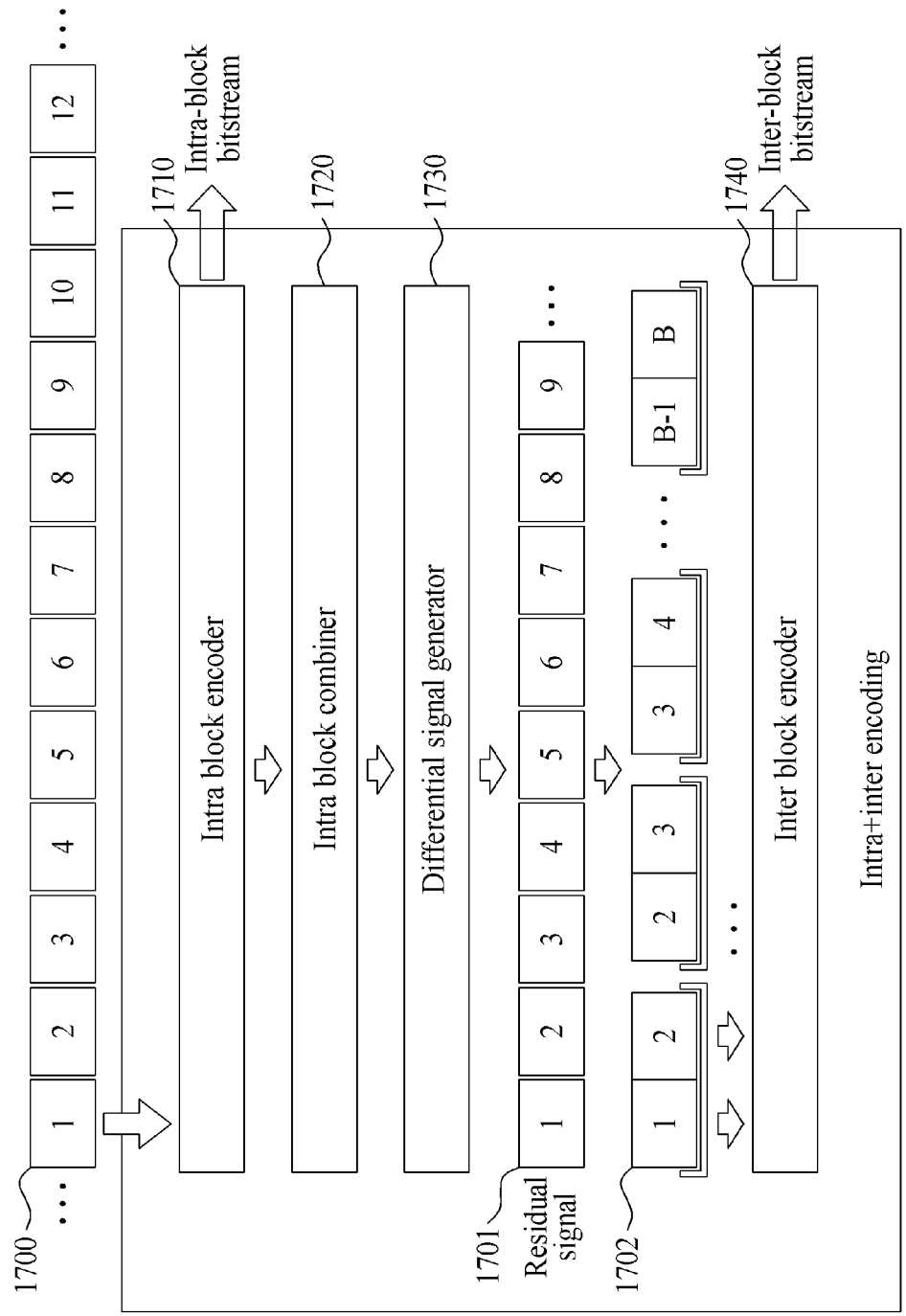
FIG. 17 illustrates an example of an audio encoding process according to the fourth example embodiment.

FIG. 17 illustrates an example of an audio encoding process according to the fourth example embodiment.

The encoding block 111 may generate 2D intra blocks by dividing each of first frame of input signal that constitute an audio signal 1700 into a plurality of first subframes. The encoding block 111 may encode the 2D intra blocks using an intra block encoder 1710. Here, the intra block encoder 1710 may convert the encoded 2D intra blocks to an intra block bitstream.

The encoding block 111 may restore second subframes from the 2D intra blocks encoded in operation 1620. Here, the encoding block 111 may generate second frame of input signal by combining the second subframes using an intra block combiner 1720.

The encoding block 111 may generate residual signals 1701 between the second frame of input signal and the first frame of input signal using a residual signal generator 1730.

The encoding block 111 may generate groups 1702 by grouping frames that constitute the residual signal 1701 by two or more based on an overlap-add.

The encoding block 111 may generate a 2D inter block using the groups 1702.

Here, the encoding block 111 may apply a window to the groups 1702. The encoding block 111 may transform the groups 1702 to which the window is applied in operation 720 to a frequency domain. Here, the encoding block 111 may transform the frame of input signal to the frequency domain by applying an MDCT to the groups 1702 based on 50% overlap-add. The encoding block 111 may generate the 2D inter block using the frame of input signal included in the groups 1702 transformed to the frequency domain. Here, the 2D inter block may be a block that two-dimensionally displays frequency coefficients of the frame of input signal transformed to the frequency domain using a time and a frequency.

The encoding block 111 may encode the 2D inter block using an inter block encoder 1740. Here, the inter block encoder 1740 may convert the encoded 2D inter block to an inter block bitstream and may output the converted inter block bitstream.

The transmitter 112 may mix the inter block bitstream and the intra block bitstream into a single bitstream, and may transmit the bitstream to the audio decoding apparatus 120.

Figure 18:
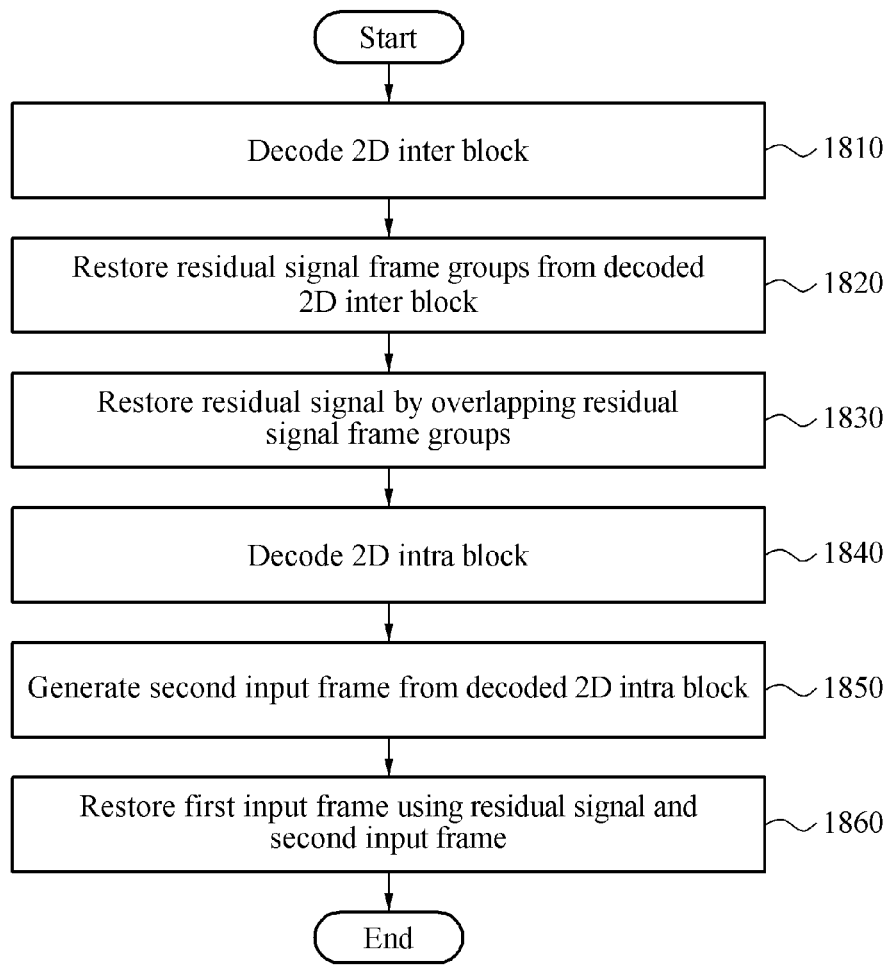
FIG. 18 is a flowchart illustrating an audio decoding method according to the fourth example embodiment.

FIG. 18 is a flowchart illustrating an audio decoding method according to the fourth example embodiment.

In operation 1810, the decoding block 122 may extract an encoded 2D inter block and an encoded 2D intra block from a bitstream. The decoding block 122 may decode a 2D inter block from the encoded 2D inter block.

In operation 1820, the decoding block 122 may restore groups of frames of a residual signal from the 2D inter block decoded in operation 1810. Here, the decoding block 122 may generate frames of a frequency domain using the decoded 2D inter block in operation 1820. The decoding block 122 may transform the frames of the frequency domain to frames of a time domain. Here, the decoding block 122 may restore the groups of the frames that constitute the residual signal by releasing a window from the frames of the time domain.

In operation 1830, the decoding block 122 may generate a residual signal by performing an overlap-add process on the groups of the frames of the residual signal restored in operation 1820.

In operation 1840, the decoding block 122 may decode a 2D intra block from the encoded 2D intra block.

In operation 1850, the decoding block 122 may restore a second frame of input signal from the 2D intra block decoded in operation 1840. Here, the decoding block 122 may generate subframes of the frequency domain using the 2D intra block. The decoding block 122 may transform the subframes of the frequency domain to subframes of the time domain. The decoding block 122 may generate the second frame of input signal by performing an overlap-add process on the subframes of the time domain.

In operation 1860, the decoding block 122 may restore the first frame of input signal that is an original frame of input signal using the second frame of input signal generated in operation 1850 and the residual signal generated in operation 1830. Here, the residual signal may be a difference between the second frame of input signal that is an frame of input signal restored from the encoded 2D intra block as generated in operation 1650, and the first frame of input signal that is an original frame of input signal. Accordingly, the decoding block 122 may restore the first frame of input signal by adding the residual signal to the second frame of input signal.

Figure 19:
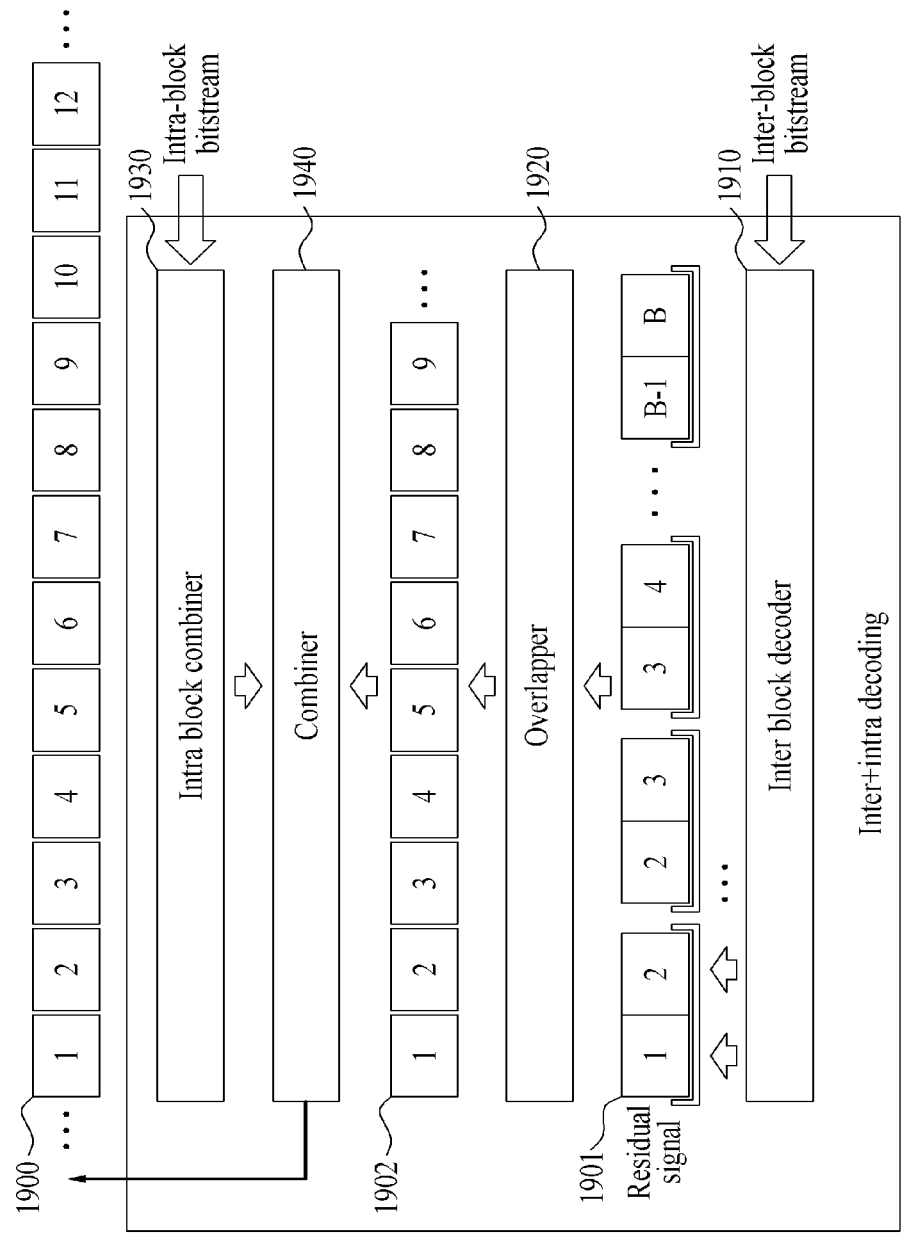
FIG. 19 illustrates an example of an audio decoding process according to the fourth example embodiment.

FIG. 19 illustrates an example of an audio decoding process according to the fourth example embodiment.

The decoding block 122 may receive an inter block bitstream converted from an encoded 2D inter block. The decoding block 122 may decode a group 1901 of residual signals from the inter block bitstream using an inter block decoder 1910.

The decoding block 122 may generate a residual signal 1902 that includes frames by performing an overlap-add process on the group 1901 of frames of the residual signal.

Also, the decoding block 122 may receive an intra block bitstream converted from an encoded 2D intra block. The decoding block 122 may decode a 2D inter block from the inter block bitstream using the intra block decoder 1930.

Here, the decoding block 122 may restore a second frame of input signal using the 2D intra block decoded in operation 1440. Here, the decoding block 122 may generate subframes of a frequency domain using the 2D intra block. The decoding block 122 may transform the subframes of the frequency domain to subframes of a time domain. The decoding block 122 may generate a second frame of input signal by performing an overlap-add process on the subframes of the time domain.

The decoding block 122 may decode an audio signal 1900 that includes first frame of input signal by adding the residual signal 1902 to the second frame of input signal using a combiner 1940.

Here, the second frame of input signal is a result of encoding and decoding the first frame of input signal. Thus, an audio signal may be generated using the second frame of input signal only. A signal varies during an encoding and decoding process. Thus, the second frame of input signal may differ from the first frame of input signal that is a frame included in an original audio signal. A residual signal refers to information indicating a difference between the first frame of input signal and the second frame of input signal. Thus, the decoding block 122 may enhance the equality of the decoded audio signal 1900 by adding the residual signal to the second frame of input signal and by decoding the first frame of input signal.

Figure 20:
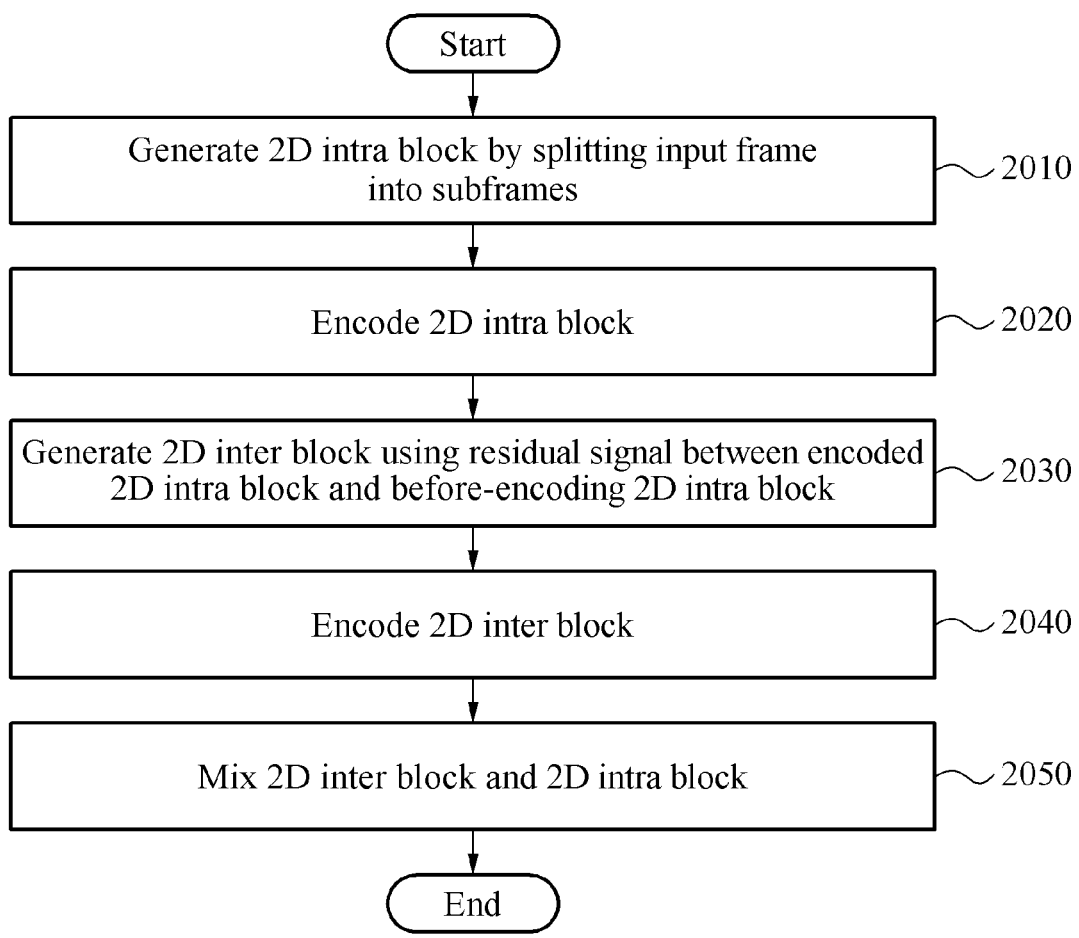
FIG. 20 is a flowchart illustrating a method of encoding an audio signal according to a fifth example embodiment.

FIG. 20 is a flowchart illustrating a method of encoding an audio signal according to a fifth example embodiment.

In operation 2010, the encoding block 111 may generate 2D intra blocks by dividing each of frame of input signal that constitute an audio signal into a plurality of subframes.

In operation 2020, the encoding block 111 may encode the 2D intra blocks generated in operation 2010.

In operation 2030, the encoding block 111 may generate a 2D inter block using residual signals between the 2D intra blocks generated in operation 2010 and the 2D intra blocks encoded in operation 2020.

In operation 2040, the encoding block 111 may encode the 2D inter block generated in operation 2030.

In operation 2050, the encoding block 111 may mix the 2D inter block encoded in operation 2040 and the 2D intra block encoded in operation 2020.

Figure 21:
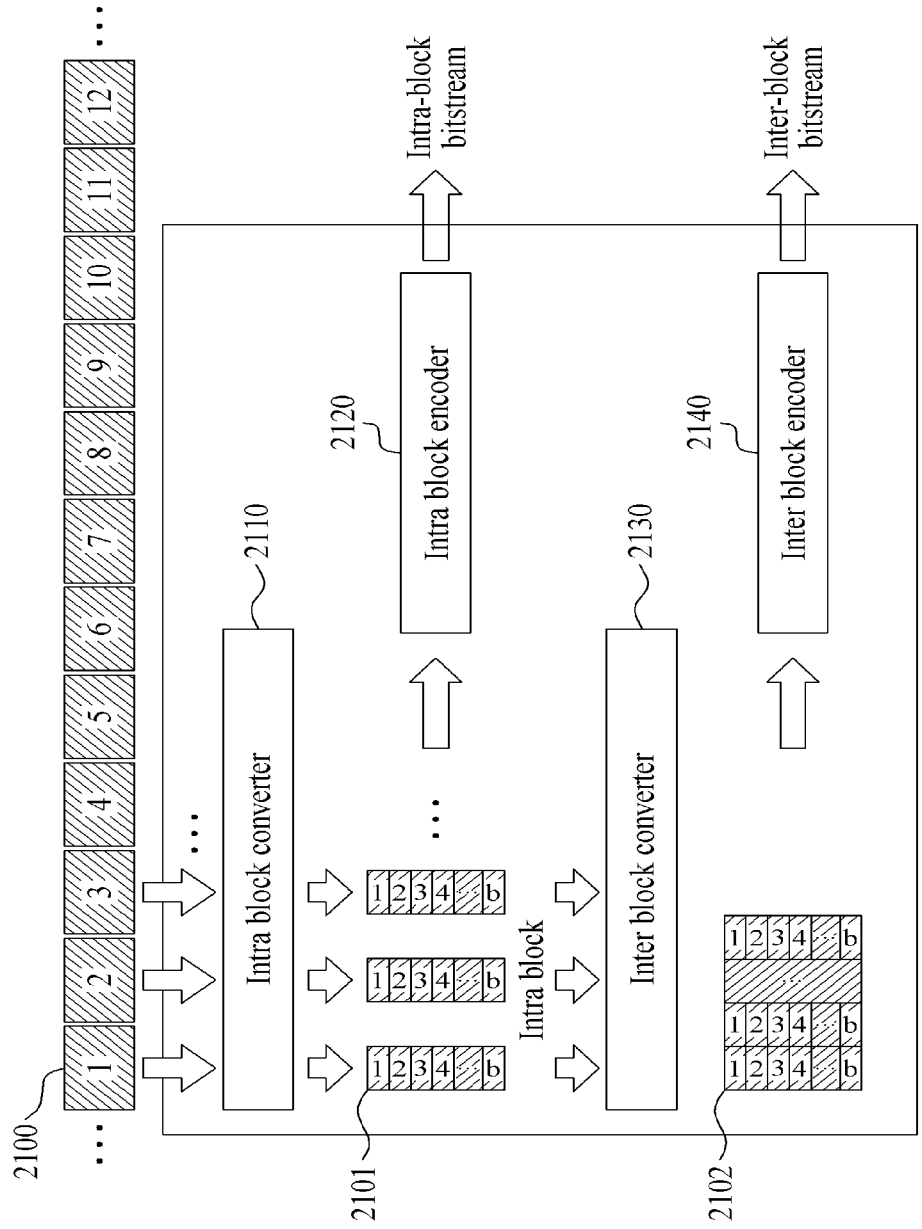
FIG. 21 illustrates an example of an audio encoding process according to the fifth example embodiment.

FIG. 21 illustrates an example of an audio encoding process according to the fifth example embodiment.

The encoding block 111 may generate 2D intra blocks by applying an intra block converter 2110 to an audio signal 2100.

In detail, referring to FIG. 21, the intra block converter 21110 may generate 2D intra blocks 2101 by dividing each of frame of input signal that constitute an audio signal into a plurality of subframes and by transforming the subframes to a frequency domain.

The encoding block 111 may encode 2D intra blocks using an intra block encoder 2120. Here, the intra block encoder 2120 may convert the encoded 2D intra blocks to an intra block bitstream and may output the converted intra block bitstream.

The encoding block 111 may generate residual signals between the 2D intra blocks 2101 and the 2D intra blocks encoded by the intra block encoder 2120.

The encoding block 111 may generate a 2D inter block 2102 by inputting the residual signals to an inter block converter 2130.

Here, the encoding block 111 may generate groups by grouping frames that constitute the residual signal by two or more based on an overlap-add. The encoding block 111 may apply a window to the groups. The encoding block 111 may transform the groups to which the window is applied to a frequency domain. The encoding block 111 may generate the 2D inter block 2102 using the frame of input signal that are included in the group transformed to the frequency domain. Here, the 2D inter block 2102 may be a block in which the 2D intra block 2101 is represented as a frequency coefficient of a sub-block unit.

The encoding block 111 may encode the 2D inter block 2102 using an inter block encoder 2140. Here, the inter block encoder 2140 may convert the encoded 2D inter block to an inter block bitstream and may output the converted inter block bitstream.

Here, the transmitter 112 may mix the inter block bitstream and the intra block bitstream into a single bitstream and may transmit the bitstream to the audio decoding apparatus 120.

Figure 22:
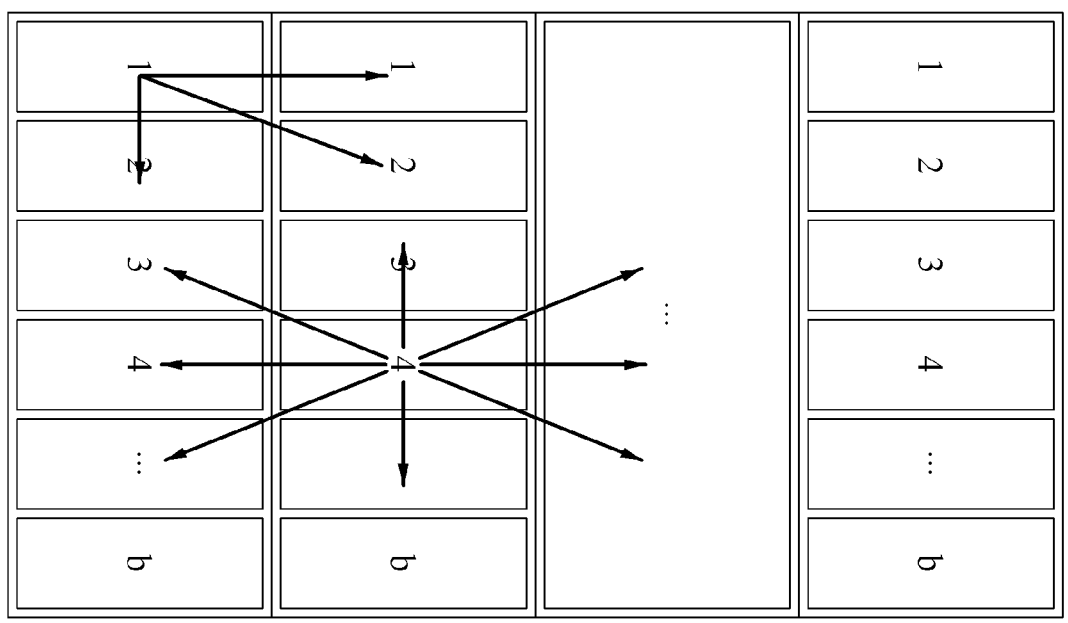
FIG. 22 illustrates an example of a quantization method according to the fifth example embodiment.

FIG. 22 illustrates an example of a quantization method according to the fifth example embodiment.

The encoding block 111 may set first subframes of 2D intra blocks to a macro block. The encoding block 111 may predict a correlation between macro blocks.

For example, referring to FIG. 22, the encoding block 111 may predict a correlation between a macro block 1 corresponding to a first macro block and other subframes adjacent to the macro block 1. Also, the encoding block 111 may predict a correlation between a macro block corresponding to a fourth macro block and other subframes adjacent to the macro block 4.

Also, as illustrated in FIG. 22, the encoding block 111 may predict a correlation between a macro block currently being processed and a macro block that is separate therefrom by a predetermined interval, instead of using an adjacent macro block. For example, the encoding block 111 may predict a correlation between the macro block currently being processed and another macro block that is separate therefrom by a plurality of macro blocks. Here, although a probability of retrieving a macro block having an optimal correlation may increase, additional information such as location information of the other macro block that are separate by the plurality of macro blocks may be further used. Accordingly, a tradeoff may be present between a distance between macro blocks between which a correlation is to be measured and a probability of retrieving a macro block having an optimal correlation.

The encoding block 111 may perform a DPCM on macro blocks corresponding to a highest predicted correlation. The encoding block 111 may quantize each of the macro blocks. The encoding block 111 may calculate a prediction gain based on a result of the DPCM and may quantize a residual signal between macro blocks corresponding to a highest correlation.

Figure 23:
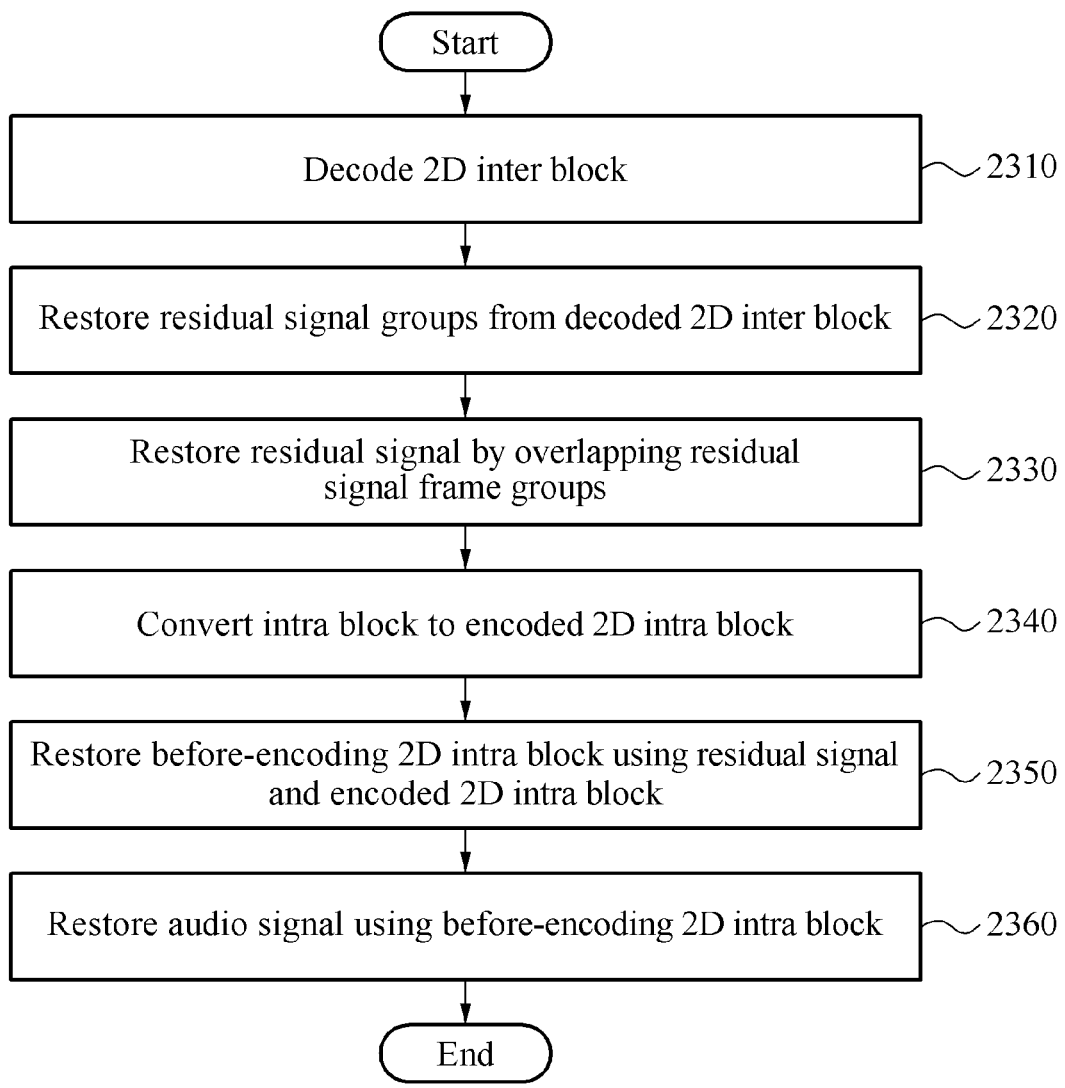
FIG. 23 is a flowchart illustrating a method of an audio decoding method according to the fifth example embodiment.

FIG. 23 is a flowchart illustrating a method of an audio decoding method according to the fifth example embodiment.

In operation 2310, the decoding block 122 may extract an encoded 2D inter block and an encoded 2D intra block from a bitstream. The decoding block 122 may decode a 2D inter block from the encoded 2D inter block.

In operation 2320, the decoding block 122 may restore groups of frames of a residual signal from the 2D inter block decoded in operation 2310. Here, the decoding block 122 may generate frames of a frequency domain using the decoded 2D inter block in operation 2320. The decoding block 122 may transform the frames of the frequency domain to frames of a time domain. Here, the decoding block 122 may restore groups of frames that constitute the residual signal by releasing a window from the frames of the time domain.

In operation 2330, the decoding block 122 may restore the residual signal by performing an overlap-add process on the groups of the frames of the residual signal restored in operation 2320.

In operation 2340, the decoding block 122 may convert an intra block bitstream to the encoded 2D intra block.

In operation 2350, the decoding block 122 may restore a before-encoding 2D intra block using the encoded 2D intra block converted in operation 2340 and the residual signal generated in operation 2330. Here, the residual signal may be a difference between the 2D intra blocks generated in operation 2010 as generated in operation 2030 and the 2D intra blocks encoded in operation 2020. Accordingly, the decoding block 122 may restore the before-encoding 2D intra block by adding the residual signal to the encoded 2D intra block.

In operation 2360, the decoding block 122 may restore an audio signal using the before-encoding 2D intra block restored in operation 2350. In detail, the decoding block may restore the audio signal that includes frame of input signal from the 2D intra block by performing operations 520 through 540 of FIG. 5.

Figure 24:
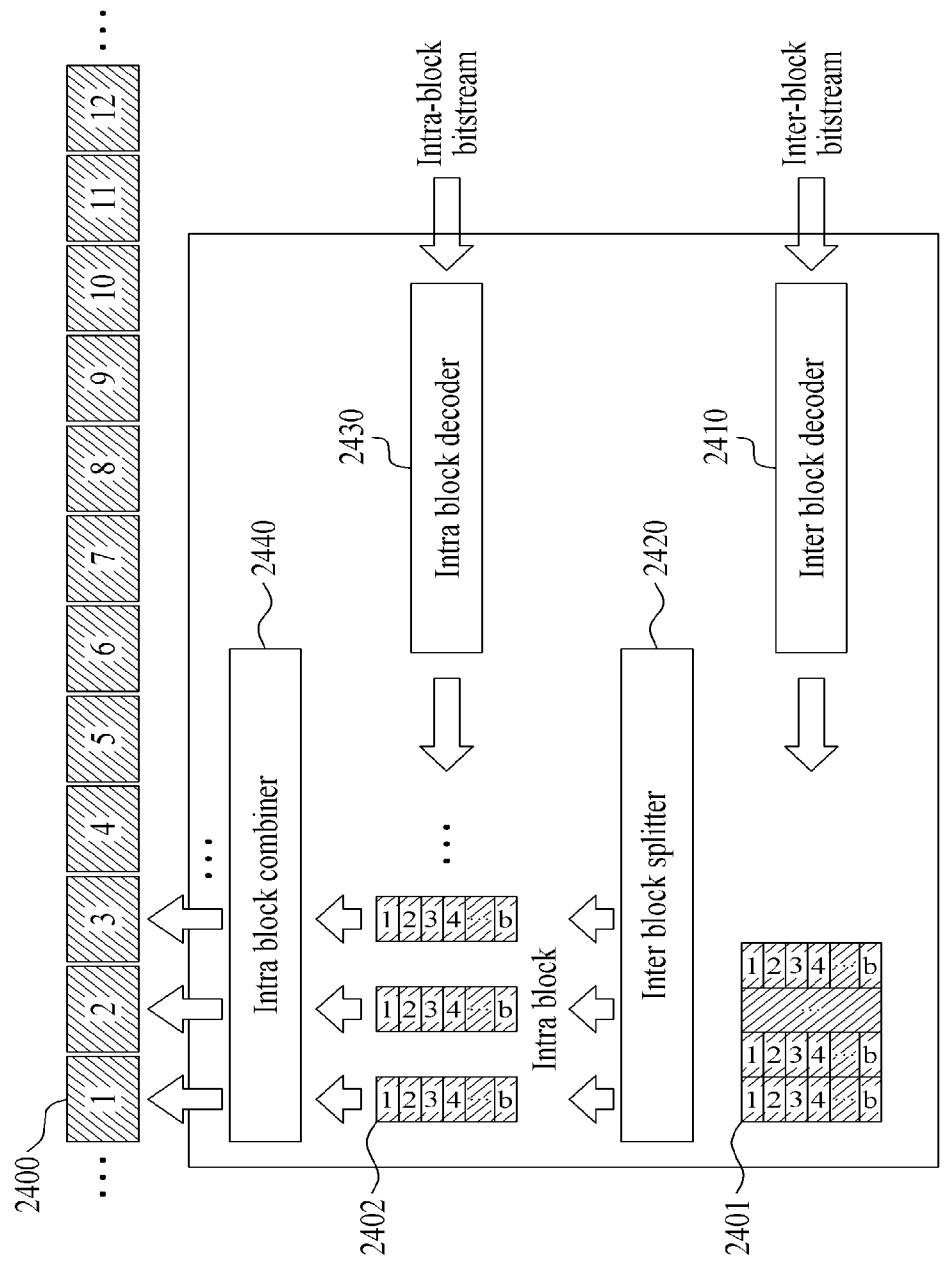
FIG. 24 illustrates an example of an audio decoding process according to the fifth example embodiment.

FIG. 24 illustrates an example of an audio decoding process according to the fifth example embodiment.

The decoding block 122 may receive an inter block bitstream that is converted from an encoded 2D inter block. The decoding block 122 may generate a residual signal 2401 from the inter block bitstream using an inter block decoder 2410.

In detail, the decoding block 122 may generate frames of a frequency domain using a decoded 2D inter block. The decoding block 122 may transform the frames of the frequency domain to frames of a time domain. Here, the decoding block 122 may restore groups of frames that constitute a residual signal by releasing a window from the frames of the time domain. The decoding block 122 may restore the residual signal 2401 by performing an overlap-add process on the groups of the frames of the residual signal.

The decoding block 122 may split the residual signal 2401 based on an intra block unit using an inter block splitter 2420.

Also, the decoding block 122 may receive an intra block bitstream that is converted from an encoded 2D intra block. The decoding block 122 may convert the inter block bitstream to the encoded 2D inter block using an intra block decoder 2430.

Here, the decoding block 122 may restore a before-encoding 2D intra block using the encoded 2D intra block and the residual signals split based on the intra block unit. In detail, the decoding block 122 may restore a before-encoding 2D intra block 2402 by adding the residual signal to the encoded 2D intra block.

Here, as illustrated in FIG. 24, the before-encoding 2D intra block 2402 may be an intra block that includes a plurality of subframes.

The decoding block 122 may restore an audio signal by combining the before-encoding 2D intra blocks 2402 using an intra block combiner 2440. In detail, the decoding block may transform subframes of the frequency domain included in the 2D intra block 2402 to subframes of a time domain. Here, the decoding block 122 may restore grouped subframes by releasing a window from the subframes of the time domain. The decoding block 122 may decode an audio signal 2400 that includes the frame of input signal by performing an overlap-add process on subframes included in a group and by sequentially determining frame of input signal 1 through 12 that constitute the audio signal 2400.

According to example embodiments, it is possible to enhance an encoding efficiency by reconfiguring and encoding an input audio signal as a 2D signal. Also, since the same framing structure as a video signal may be achieved using an encoding scheme that is interpreted based on a block unit, it is possible to flexibly perform homogeneity and synchronization of an encoding scheme compared to a conventional encoding method.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as floptical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been illustrated and described above. Nevertheless, it should be understood that various modifications and alterations may be made to these example embodiments from the description.

Therefore, the scope of the disclosure is defined not by the detailed description, but by the claims and their equivalents, and all variations within the scope of the claims and their equivalents are to be construed as being included in the disclosure.

What is claimed is:

1. A method of encoding an audio signal, the method comprising:
   dividing each first frame of input signal that constitute an audio signal into a plurality of first subframes;
   transforming the first subframes to a frequency domain;
   determining a two-dimensional (2D) intra block using the first subframes transformed to the frequency domain; and
   encoding the 2D intra block,
   wherein the 2D intra block is a block that two-dimensionally displays frequency coefficients of the first subframes transformed to the frequency domain using a time and a frequency,
   wherein the transforming of the subframes to the frequency domain comprises:
   grouping the first subframes based on an overlap-add;
   applying a window to the grouped first subframes; and
   transforming the first subframes to which the window is applied to the frequency domain,
   wherein the grouping comprises grouping a last subframe divided from a current frame and a first subframe divided from a subsequent frame among the first frame of input signal.

2. The method of claim 1, wherein the encoding comprises:
   dividing each of the first subframes of the 2D intra block into a plurality of subband signals;
   predicting a correlation between the subband signals;
   quantizing a high band signal of which a bandwidth value is greater than a reference value among the subband signals, using a scale factor;
   quantizing a prediction result of a low band signal of which a bandwidth value is less than or equal to the reference value among the subband signals and a residual signal between the subband signals; and
   converting a quantization index, the scale factor, the quantized high band signal, the residual signal, and the prediction result to a bitstream.

3. The method of claim 1, further comprising:
   restoring second subframes from the encoded 2D intra blocks;
   determining second frame of input signal by combining the second subframes;
   determining a 2D inter block using residual signals between the second frame of input signal and the first frame of input signal;
   encoding the 2D inter block; and
   mixing the encoded 2D inter block and the encoded 2D intra block.

4. The method of claim 3, wherein the encoding of the 2D inter block comprises:
   setting first subframes of the 2D intra blocks as a macro block;
   predicting a correlation between macro blocks;
   performing a differential pulse code modulation (DPCM) on macro blocks corresponding to a highest predicted correlation;
   quantizing each of the macro blocks; and
   calculating a prediction gain based on a result of the DPCM, and quantizing a residual signal between the macro blocks corresponding to the highest predicted correlation.

5. A method of encoding an audio signal, the method comprising:
   grouping first frame of input signal that constitute an audio signal based on an overlap-add;
   applying a window to the grouped first frame of input signal;
   transforming the first frame of input signal to which the window is applied to a frequency domain;
   determining a two-dimensional (2D) inter block using the first frame of input signal transformed to the frequency domain; and
   encoding the 2D inter block, wherein the 2D inter block is a block that two-dimensionally displays frequency coefficients of the first frame of input signal transformed to the frequency domain using a time and a frequency, wherein the encoding comprises:

dividing each of the frame of input signal of the 2D inter block into subband signals;

predicting a correlation between the subband signals;

quantizing each of the subband signals; and calculating a prediction gain based on the correlation and quantizing a residual signal between the subband signals.

6. The method of claim 5, further comprising:

restoring second frame of input signal from the encoded 2D inter block;

determining a 2D intra block using a residual signal between the second frame of input signal and the first frame of input signal;

encoding the 2D intra block; and mixing the encoded 2D inter block and the encoded 2D intra block.

7. The method of claim 6, wherein the determining of the 2D inter block comprises:

grouping a plurality of first frame of input signal based on an overlap-add;

applying a window to the grouped plurality of first frame of input signal;

transforming the first frame of input signal to which the window is applied to a frequency domain; and determining a 2D inter block using the first frame of input signal transformed to the frequency domain.

8. The method of claim 6, wherein the determining of the 2D intra block comprises:

dividing the residual signal between the second frame of input signal and the first frame of input signal into a plurality of subframes;

transforming the plurality of subframes to a frequency domain; and determining a 2D intra block using the subframes transformed to the frequency domain.

9. A method of decoding an audio signal, the method comprising:

receiving an intra block bitstream converted from an encoded 2D intra block;

decoding a two-dimensional (2D) inter block based on the intra block bitstream;

restoring groups of a frame of an input signal from the 2D inter block;

determining a first frame of the input signal by performing an overlap-add process on the restored groups of the frame of input signal;

decoding a 2D intra block from an encoded 2D intra block;

restoring a residual signal from the 2D intra block; and restoring a second frame of the input signal that is an original frame of the input signal using the residual signal and the first frame of the input signal.

\* \* \* \* \*